United States Patent
Peterson

(10) Patent No.: US 7,385,612 B1
(45) Date of Patent: Jun. 10, 2008

(54) DISTORTION OF RASTER AND VECTOR ARTWORK

(75) Inventor: John Peterson, Menlo Park, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 10/160,574

(22) Filed: May 30, 2002

(51) Int. Cl.
*G09G 5/00* (2006.01)

(52) U.S. Cl. .................... 345/619; 345/581

(58) Field of Classification Search ............ 345/442, 345/591–594, 646–647, 441, 619, 581, 474
See application file for complete search history.

(56) References Cited

U.S. PATENT DOCUMENTS

| | | | |
|---|---|---|---|
| 5,428,728 A * | 6/1995 | Lung et al. ............... | 345/469 |
| 5,481,659 A | 1/1996 | Nosaka et al. | |
| 5,539,868 A | 7/1996 | Hosoya et al. | |
| 5,598,182 A | 1/1997 | Berend et al. | |
| 5,731,819 A * | 3/1998 | Gagne et al. ............. | 345/647 |
| 5,731,820 A | 3/1998 | Broekhuijsen | |
| 5,736,991 A * | 4/1998 | Tada ....................... | 345/474 |
| 5,754,183 A | 5/1998 | Berend et al. | |
| 5,852,447 A | 12/1998 | Hosoya et al. | |
| 5,857,067 A | 1/1999 | Hassett et al. | |
| 5,920,324 A | 7/1999 | Hasegawa et al. | |
| 5,929,867 A | 7/1999 | Herbstman et al. | |
| 6,157,390 A | 12/2000 | Cheng | |
| 6,201,549 B1 * | 3/2001 | Bronskill ................. | 345/441 |
| 6,232,987 B1 | 5/2001 | Choi et al. | |
| 6,271,864 B1 * | 8/2001 | Graham ................... | 345/442 |
| 6,300,955 B1 | 10/2001 | Zamir | |
| 6,459,439 B1 | 10/2002 | Ahlquist, Jr. et al. | |
| 6,501,475 B1 | 12/2002 | Cheng | |
| 6,522,328 B1 * | 2/2003 | Asente ..................... | 345/441 |
| 6,628,295 B2 * | 9/2003 | Wilensky ................. | 345/594 |
| 6,633,300 B1 * | 10/2003 | Tomack et al. .......... | 345/581 |
| 6,765,589 B1 * | 7/2004 | Georgiev et al. ......... | 345/646 |
| 6,803,913 B1 * | 10/2004 | Fushiki et al. ........... | 345/467 |
| 6,870,545 B1 * | 3/2005 | Smith et al. ............. | 345/619 |
| 6,911,980 B1 * | 6/2005 | Newell et al. ............ | 345/441 |
| 6,919,888 B1 * | 7/2005 | Perani et al. ............ | 345/420 |
| 6,999,101 B1 * | 2/2006 | Sanborn et al. .......... | 345/619 |

OTHER PUBLICATIONS

Barry Fowler, Geometric manipulation of tensor product surfaces, Proceedings of the 1992 symposium on Interactive 3D graphics, p. 101-108, Jun. 1992, Cambridge, Massachusetts, United States.*

(Continued)

*Primary Examiner*—Jin-Cheng Wang
(74) *Attorney, Agent, or Firm*—Fish & Richardson P.C.

(57) ABSTRACT

Systems and techniques to apply an image distortion to two image objects of different graphic types. In general, in one implementation, the technique includes: receiving an image distortion description to be applied to an image portion including a vector graphic and a raster graphic, the raster graphic being distortable separate from the vector graphic, applying the image distortion description to the vector graphic to produce a distorted vector graphic, and applying the image distortion description to the raster graphic to produce a distorted raster graphic, the distorted vector graphic and the distorted raster graphic together forming a distorted image portion.

28 Claims, 14 Drawing Sheets

OTHER PUBLICATIONS

Venkat Krishnamurthy, Marc Levoy, Fitting smooth surfaces to dense polygon meshes, Proceedings of the 23rd annual conference on Computer graphics and interactive techniques, p. 313-324, Aug. 1996.*

Frederick W. B. Li, Rynson W. H. Lau, Real-time rendering of deformable parametric free-form surfaces, Proceedings of the ACM symposium on Virtual reality software and technology, p. 131-138, Dec. 20-22, 1999, London, United Kingdom.*

Tony DeRose, Michael Kass, Tien Truong, Subdivision surfaces in character animation, Proceedings of the 25th annual conference on Computer graphics and interactive techniques, p. 85-94, Jul. 1998.*

Tim Milliron, Robert J. Jensen, Ronen Barzel, Adam Finkelstein, A framework for geometric warps and deformations, ACM Transactions on Graphics (TOG), v. 21 N. 1, p. 20-51, Jan. 2002.*

Steven Schkolne, Michael Pruett, Peter Schröder, Surface drawing: creating organic 3D shapes with the hand and tangible tools, Proceedings of the SIGCHI conference on Human factors in computing systems, p. 261-268, Mar. 2001, Seattle, Washington.*

Karan Singh, Eugene Fiume, Wires: a geometric deformation technique, Proceedings of the 25th annual conference on Computer graphics and interactive techniques, p. 405-414, Jul. 1998.*

CorelDraw 9 for Windows: Visual QuickStart Guide, Publisher: Peachpit Press, Jul. 6, 1999, Chapters 4, 14-16.*

CorelDraw 10 for Windows: Visual QuickStart Guide, Publisher: Peachpit Press, Nov. 6, 2001, Chapters 4, 14-16.*

U.S. Appl. No. 09/458,917, filed Dec. 10, 1999, Newell et al.

Peterson, John W., "IV.6 Tessellation of NURB Surfaces," Copyright 1994 by Academic Press, Inc.

Watkins, M.A. and Worsey, A.J., "Degree reduction of Bezier curves," CAD v20, #7, Sep. 1988.

Peterson, John, "Letters to the Editor Degree Reduction of Bezier curves," Computer Aided Design vol. 23, #6 Jul./Aug. 1991.

DeRose, Tony D. et al, "Functional Composition Algorithms via Blossoming," May 28, 1992.

Heckbert, Paul S., "Fundamentals of Texture Mapping and Image Warping," Master's Thesis, Dept. of Electrical Engineering and Computer Science University of California, Berkeley, CA, Jun. 17, 1989.

Richard H. Bartels et al., "A Technique for the Direct Manipulation of Spline Curves", Graphics Interface 1989, pp. 33-37.

Barry Fowler, "Geometric Manipulation of Tensor Product Surfaces", ACM 0-89791-471-6/92/0003/0101, 1992, pp. 101-108.

* cited by examiner

DISTORTION OF RASTER AND VECTOR ARTWORK

BACKGROUND OF THE INVENTION

The present application describes systems and techniques relating to distortion of raster and vector artwork.

Many types of artwork are stored and manipulated in computing machines, and such artwork can be stored digitally in multiple formats. A single artwork image can include multiple distinct image objects, which can also be stored in different formats. For example, a raster graphic is an image object stored as a set of pixel values corresponding to a defined frame (e.g., a rectangular grid). The pixel values can include multiple values for each pixel, including multiple color values, transparency/opacity values, and/or mask values (e.g., an image clipping mask). A raster graphic represents an image as a set of discrete image samples. A vector graphic is an image object stored using a set of two-dimensional coordinates connected by lines or curves (e.g., cubic Bézier curves). Examples of vector graphics include symbols, shapes, and text represented by outline fonts.

Interactive painting and illustration software products, such as Illustrator®, provided by Adobe Systems Incorporated of San Jose, Calif., provide tools to allow a user to distort an image object. Such distortion functionality can be useful for adding creative effects to an image object and/or to integrate an image object with other elements in a finished design (e.g., fitting artwork onto a circular label, or making artwork appear three-dimensional). Image distortions include geometric and optical distortions, as well as image warps and deformations generally (e.g., a deformation and a warp of a two-dimensional image are examples of an image distortion).

Example illustration software products that allow distortions of raster images include Goovie®, provided by Meta-Creations Corporation of Carpinteria, Calif., Ampex Video Art, provided by Ampex Corporation of Redwood City, Calif., and Photoshop®, provided by Adobe Systems Incorporated of San Jose, Calif. Example illustration software products that allow distortions of vector artwork include FreeHand®, provided by Macromedia Inc. of San Francisco, Calif., and CorelDraw, provided by Corel Corporation of Ottawa, Ontario, Canada.

SUMMARY OF THE INVENTION

In general, in one aspect, the invention features application of an image distortion to two image objects of different graphic types. According to an aspect, a single image distortion description can be received, and this image distortion description can be applied to two image objects of different graphic types to distort the image objects, where the image objects are separately distortable. The distortion of the two image objects can create a consistent distortion across the image objects as defined by the image distortion description, while retaining the distinct graphic characteristics of the two image objects. Moreover, the distortion description can be applied to the second image object independently from the application to the first image object. One image object need not be distorted through another image object, and the two image objects can be distorted by the same distortion description even if they are not distorted simultaneously.

Advantageous implementations of the invention include one or more of the following features. An image distortion description to be applied to an image portion can be received through a single interface tool in a graphical user interface. The image portion can be a whole image or part of an image and can include a vector graphic and a raster graphic, where the raster graphic is distortable separate from the vector graphic (i.e., there need not be a predefined mapping association between the raster graphic and the vector graphic). The image distortion description can be applied to the vector graphic to produce a distorted vector graphic, and the image distortion description can be applied to the raster graphic to produce a distorted raster graphic. The distorted vector graphic and the distorted raster graphic together form a distorted image portion.

The image distortion description can be applied to the raster graphic independently from the image distortion description being applied to the vector graphic. The image distortion description can include a mathematical definition of an image distortion in two dimensions. Distorting the raster graphic can involve using the image distortion description as a control structure governing resampling of the raster graphic. Distorting the raster graphic can involve tessellating the image distortion description, and resampling the raster graphic based on the tessellated image distortion description. Distorting the vector graphic can involve composing the image distortion description with the vector graphic to retain curve information as curve information and to maintain a resolution independent aspect of the vector graphic.

The raster graphic need not have a mapping association with another image object in the image portion. The image portion can be part of a final format electronic document. Receiving the image distortion description can involve receiving a first input designating the raster graphic to be distorted, receiving a second input designating the vector graphic to be distorted, and receiving a third input defining the image distortion description. Receiving the first and second inputs designating the raster graphic and vector graphic can involve receiving inputs defining a selection box to cover a portion of the raster graphic and a portion of the vector graphic. Alternatively, receiving the first and second inputs designating the raster graphic and vector graphic can involve receiving inputs generated by a macro operation.

Receiving the third input defining the image distortion description can involve receiving inputs specifying a configuration of an adjustable predefined distortion type, or receiving inputs specifying movements of a cursor across a distortion region. Distorting the vector graphic can involve converting coordinates of the vector graphic into a parameter space of the distortion region. Distorting the raster graphic can involve subdividing the image distortion description before applying the image distortion description to the raster graphic, if the distortion region is larger than the raster graphic. The image distortion description can include a tensor-product Bézier mesh, and the vector graphic can include a cubic Bézier curve.

A system can be provided to implement these features and techniques. The system can be part of a general purpose processing system, or the system can be a special purpose system designed for image processing and manipulation. Implementations of the systems and techniques described here may occur in hardware, firmware, software or a combination of them and may include instructions for causing a machine to perform the operations described.

The invention can be implemented to realize one or more of the following advantages. Multiple types of image objects, such as vector graphics and raster graphics, can be distorted simultaneously using a uniform control interface while retaining the original formats. A graphical user interface can provide a single warping tool that allows both raster and vector artwork to be distorted together. A single distortion description is applied to both vector and raster artwork to produce a consistent distortion across a distorted image, without converting the vector graphic into a raster graphic. Because vector artwork need not be converted into raster form to accomplish the distortion, the advantages of vector artwork (e.g., device independent resolution) are retained. The distortion description can be a free-form distortion or a predefined type of distortion. A user of the distortion tool does not need to consider format differences between the various image objects selected for distortion.

A mathematical control structure (e.g., a tensor product Bézier mesh) can be used to specify an image distortion, and this same mathematical control structure can be applied to both vector graphics and raster graphics, thus allowing a user of a painting and illustration program to distort both vector graphics and raster graphics at the same time with one image distortion description. The geometric result is the same on both types of artwork, and the process is transparent to the user.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference symbols in the various drawings indicate like elements.

DETAILED DESCRIPTION

As used herein, the terms "artwork", "image object" and "graphic" are used interchangeably. Thus, a raster graphic is also referred to as a raster image object and raster artwork (with no intended suggestion that the graphic is in fact art). A graphic is a set of data defining an image or image portion that can be displayed.

Figure 1:
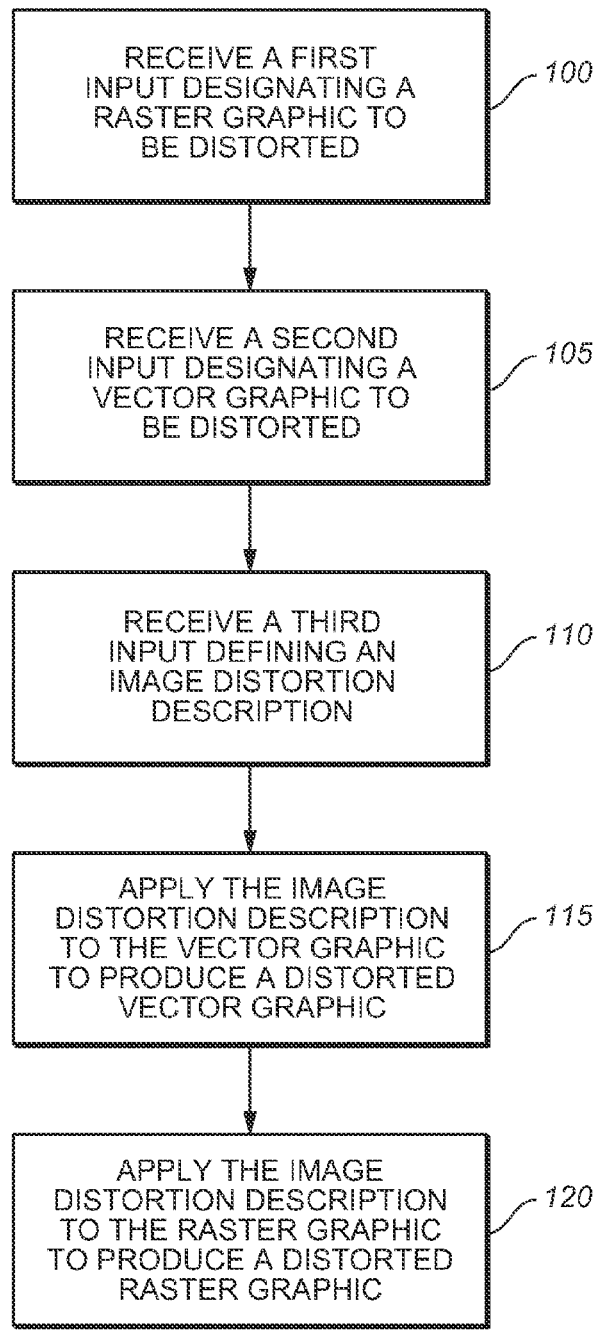
FIG. 1 is a flowchart showing a process of distorting a group of image objects of different graphic types, including a raster graphic and a vector graphic.

FIG. 1 is a flowchart showing a process of distorting a group of image objects of different graphic types, including a raster graphic and a vector graphic. A first input designating a raster graphic to be distorted is received at 100. A second input designating a vector graphic to be distorted is received at 105. The manner and order of the designations can be varied, but in general, a vector graphic and a raster graphic are separately designated by a user. Moreover, additional raster and vector graphics and/or portions of raster and vector graphics can be designated (e.g., selected, or defined) for the same distortion to be applied.

Once a group of image objects have been designated, a third input defining an image distortion description is received at 110. The image distortion description can describe a free-form distortion or a predefined type of distortion, such as a twist, squeeze, twirl, wave, flag, arc, zig-zag, ripple, spherify, pucker, bloat, or reflection distortion. The third input can be received from a distortion tool interface that can be a simple button or a more detailed interface that allows a user to adjust distortion parameters before application and/or to paint a distortion directly onto the designated raster and vector graphics. Detailed interfaces can be provided for free-form distortion tools and/or predefined-type distortion tools.

The image distortion description is a mathematical definition of an image distortion in two dimensions. This mathematical definition can include higher dimensional components, but in general, the mathematical definition represents a mapping of a first two-dimensional image to a second two-dimension image. The image distortion description is applied to the vector graphic to produce a distorted vector graphic at 115. Straight lines in the vector graphic can be converted into curves as needed, and curves in the vector graphic can be distorted by modifying their control points and/or subdividing them into additional curves.

The same image distortion description is applied to the raster graphic to produce a distorted raster graphic at 120. The frame of the raster graphic can be warped by the image distortion description into a distorted frame, and the image distortion description (e.g., a distortion surface such as a Bézier tensor product mesh) can be converted into small polygons (e.g., triangles) that cover the distorted frame. For each polygon, the portion of the original raster graphic can be mapped onto the corresponding polygon.

The same distortion can thus be applied to both raster image objects and vector image objects at essentially the same time. A user of an interactive painting and illustration program need not be aware of which objects in a piece of artwork are vector graphics and which are raster graphics. A uniform set of user interface controls for image distortion can be provided. Such uniform interface controls can allow deformation and warping of selected artwork without changing the underlying fundamental nature of the artwork. Raster artwork remains raster artwork, and vector artwork remains vector artwork, but both are distorted in a visually consistent manner across a distortion region as defined by the image distortion description.

Figure 2:
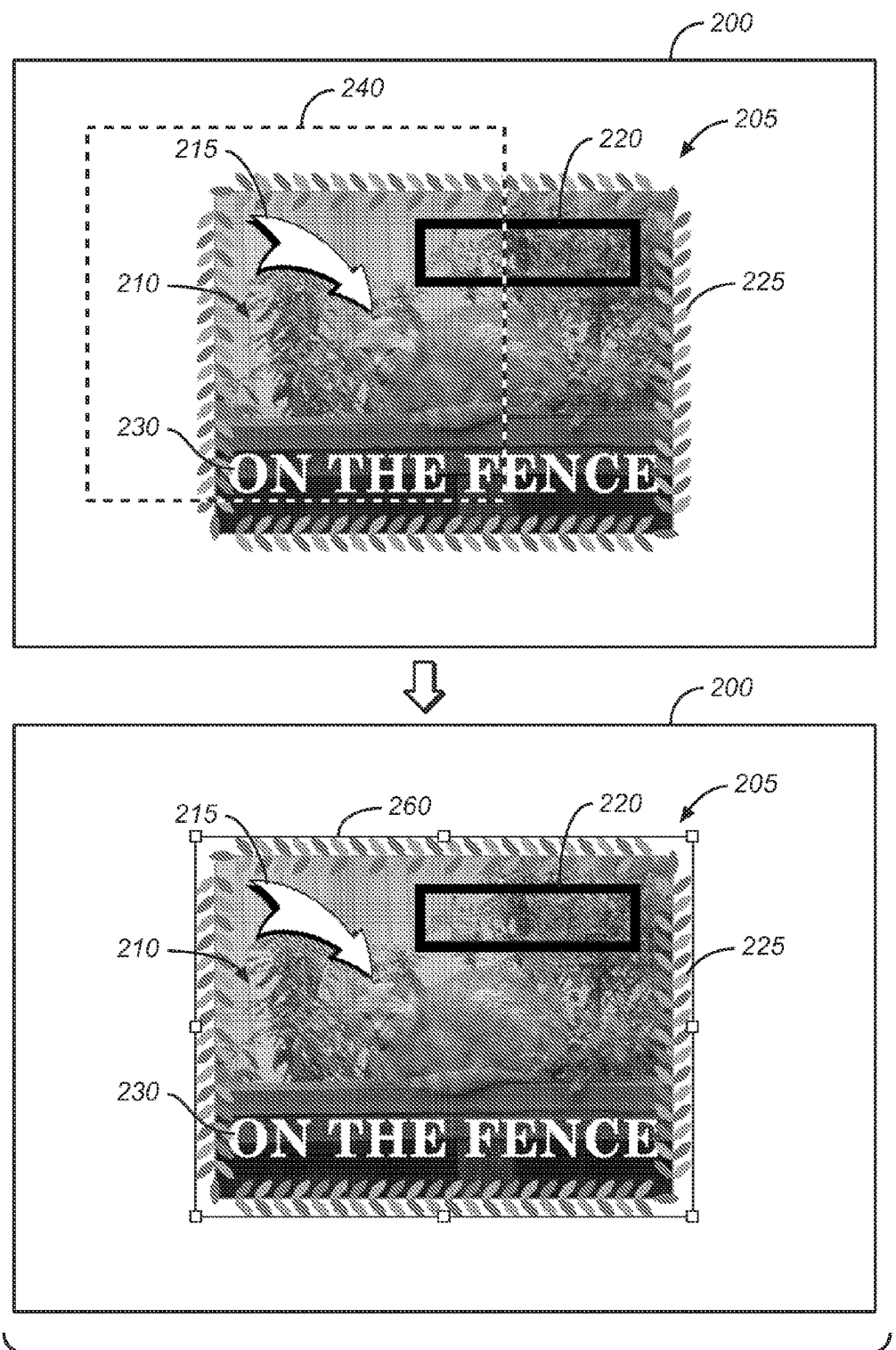
FIG. 2 illustrates designation of a raster graphic and multiple vector graphics to be distorted.

FIG. 2 illustrates designation of a raster graphic and multiple vector graphics to be distorted. An image 200 is a piece of artwork that includes an image portion 205, which itself is another image. The image 205 includes multiple image objects: a raster graphic 210, which is a picture of a cat, an arrow vector graphic 215, a box vector graphic 220, a border vector graphic 225, and a text vector graphic 230. The image objects have coordinates associated with the image 200 but not necessarily with each other. The image objects can be selected and/or portions of the image objects can be defined for distortion. Text objects that are not vector graphics can be dynamically converted to vector graphics (e.g., converted to outline fonts, or an alternative vector graphic format that includes text data, such as Unicode or ASCII (American Standard Code for Information Interchange) data) before being distorted. Such conversion of text objects can be performed by a user or automatically by the distortion control interface. Additionally, a distortion operation can be applied directly using a graphical painting tool, such as a brush tool of variable shapes and sizes.

When a portion of a raster graphic is defined for distortion (e.g., a selection box is drawn over a portion of the raster graphic), that portion can be separated and treated as a distinct raster graphic for distortion. A distortion region of the raster graphic and a slightly larger sampling region can be defined. When a portion of a vector graphic is defined for distortion, that portion can be carved off and treated as a distinct vector graphic for distortion. The non-distortion portion of the vector graphic can either be separated from the distortion portion, or remain connected (e.g., with a straight line). Carving off the distortion portion can involve finding a parametric point along a curve (e.g., the point at which the curve intersects an edge of the distortion region) and creating two curves that intersect at this parametric point.

Image objects can be designated for distortion using a point-and-click-interface, a selection box drawing interface, or other interfaces. For example, a selection box 240 can be drawn over the image 205 to select the image objects and define a distortion region. The box 240 can define a distortion region directly, in which case the box 240 designates a portion of the raster graphic 210, the entire arrow vector graphic 215, a portion of the box vector graphic 220, a portion of the border vector graphic 225, and a portion of the text vector graphic 230. In this case, the box 240 represents the distortion region.

Alternatively, the box 240 can define the distortion region indirectly by selecting all image objects that the box 240 either contains or intersects. In this case, the box 240 defines a distortion region 260 that includes all of the image objects in the image 205. The selection box interface of this example provides the first and second inputs described above. Thus, drawing the box 240 to cover an upper left corner of the border vector graphic 225 represents the first input designating the vector graphic, and drawing the box 240 over an upper left corner of the raster graphic 210 represents the second input designating the raster graphic. Alternative image object designation techniques are also possible, including macro operations, such as pressing Ctrl-A to designate all image objects on a page or pressing a mouse button with a cursor within a predefined distance of two or more image objects, that cause the separate inputs designating the vector graphic and the raster graphic to be generated.

Figure 3:
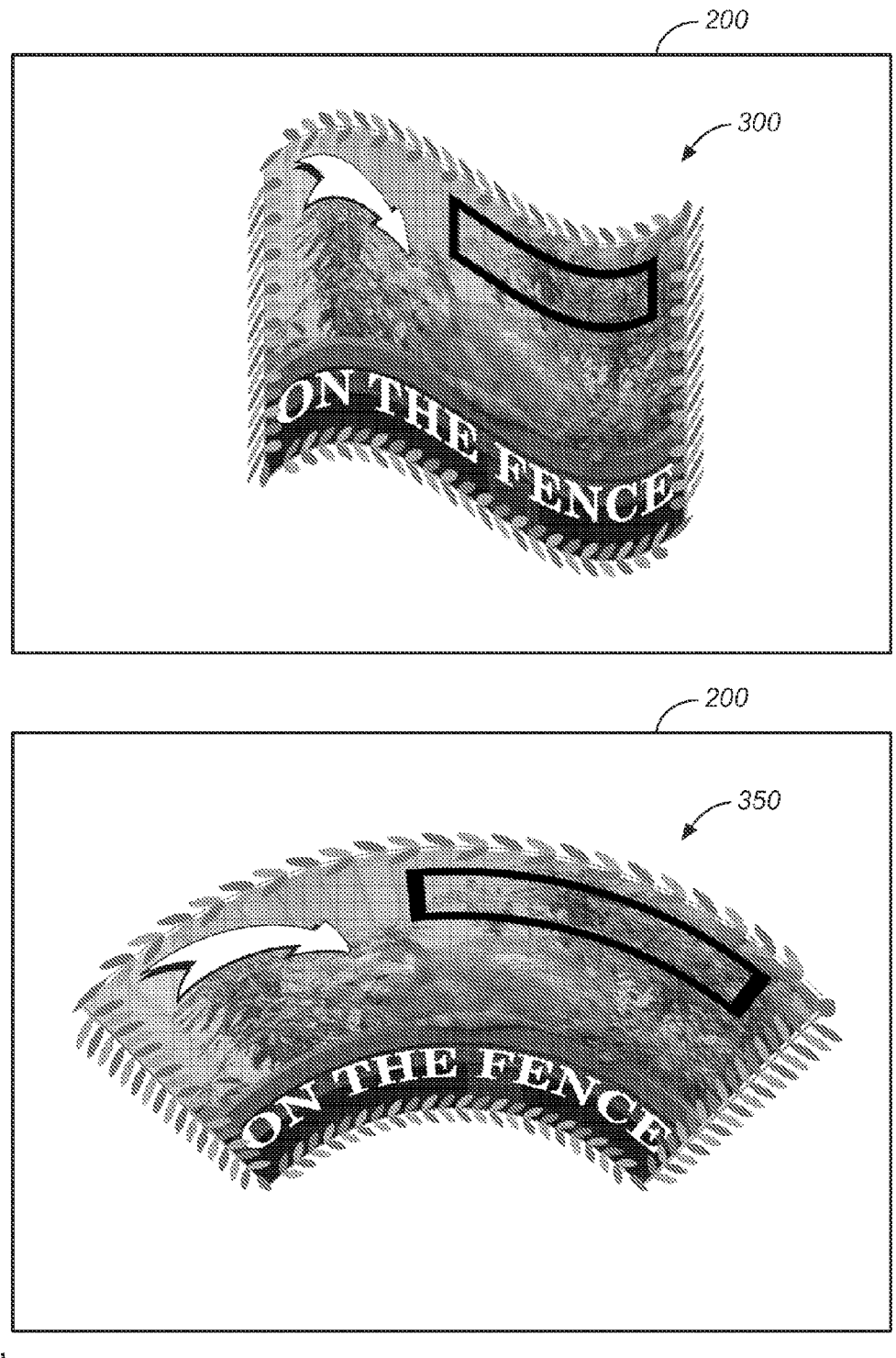
FIG. 3 illustrates results of two predefined image distortions.

FIG. 3 illustrates results of two predefined image distortions. A first distortion shows the artwork image 200 as modified by a predefined flag distortion to create a flag image 300. A second distortion shows the artwork image 200 as modified by a predefined arc distortion to create an arc image 350.

Figure 4:
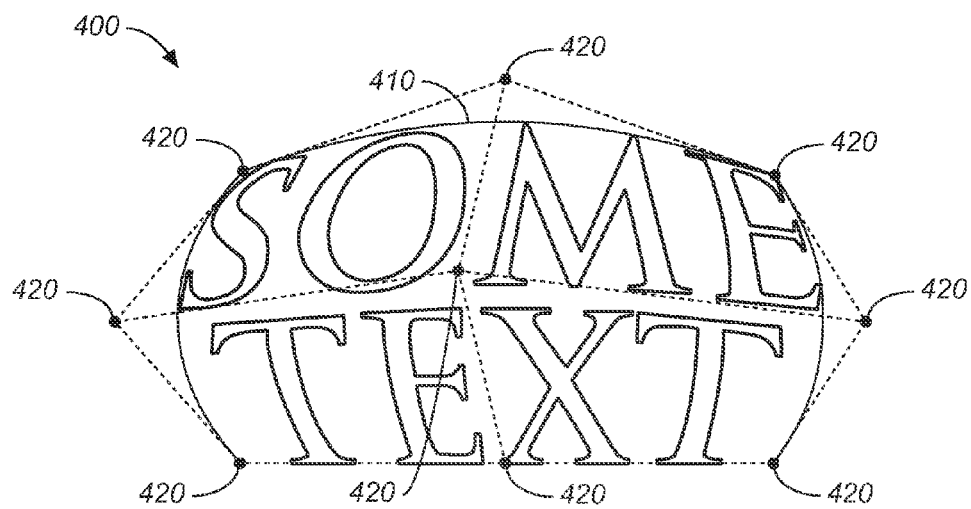
FIG. 4 illustrates an image distortion description.

FIG. 4 illustrates an image distortion description. The image distortion description is a mathematical definition of an image distortion in two dimensions. This mathematical definition can be parameterized using a grid of control points. When a distortion region is defined, a uniform surface (e.g., a rectangular surface) can be created over the artwork in the distortion region. By distorting the shape of the uniform surface, the artwork in the distortion region can be distorted in a manner corresponding to the distorted surface.

For example, a piece of artwork 400 has an associated distortion surface 410, which can be a tensor product surface. The distortion surface 410 has nine control points 420 that define the shape of the surface and thus the mapping of the artwork 400 from a undistorted two-dimensional image to a distorted two-dimensional image. Additional control points can be used, and the distortion surface can be a Bézier bicubic surface, which has sixteen control points.

These control points can be moved individually to reshape the distortion surface, or a more intuitive control interface can be provided. Additional control handles can be provided that have predefined effects on the control points of the distortion surface to create an adjustable predefined type of distortion (e.g., symmetrical distortions such as those mentioned previously). Alternatively, a free-form type of distortion control interface can be provided, such as a control interface that draws an envelope around a distortion region and allows dragging of the envelope, or a control interface that causes movements of a cursor across the distortion region to have predefined effects on the distortion surface such as allowing dragging of arbitrary points within the distortion region.

Figure 5:
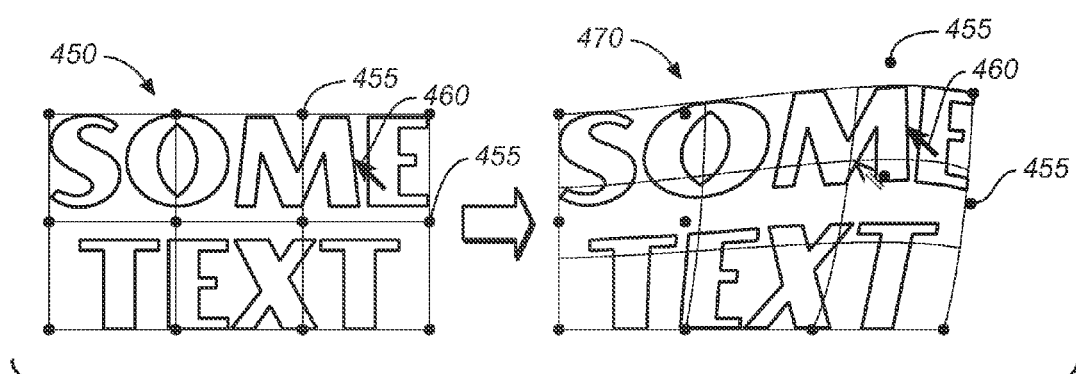
FIG. 5 illustrates a technique for receiving an image distortion description.

FIG. 5 illustrates a technique for receiving an image distortion description. A piece of artwork 450 has an associated distortion surface with control points such as control points 455. A cursor 460 can be used to select and drag an arbitrary target point on the distortion surface and the software determines how the control points, and thus the distortion surface, are distorted. The distortion surface behaves as a flexible or pliable sheet, which can be stretched and pulled using the cursor 460. Thus, movement of the cursor 460 causes movement of the control points, where the amount of movement of a control point depends on that control point's relation to an arbitrary point on the distortion surface being dragged. The distortion surface can have many control points creating a mesh. For example, the distortion surface can be a tensor product Bézier mesh.

Manipulation of curves forms the basis of the flexible sheet method of distortion manipulation described above. Moreover, the notation for curves is simpler than for surfaces, thus curve manipulation is described first.

A Bézier curve is defined as:

$$C(t) = \sum_{i=0}^{d} P_i B_i^d(t)$$

Where $P_i$ are the control points, and $B_i^d(t)$ are the Bézier basis functions, defined as:

$$B_i^d(t) = \binom{d}{i} t^i (1-t)^{d-i}$$

d is the degree of the curve (e.g., for a cubic curve, d=3) and the curve has d+1 control points. In order to manipulate the curve, we wish to drag a particular point on the curve $C(t_{drag})$ to a point $P_{drag}$ such that the curve is adjusted in a natural way. Doing this involves first determining $t_{drag}$, which is the parameter of the curve that corresponds to the point on the curve to be moved to the new location.

Figure 6:
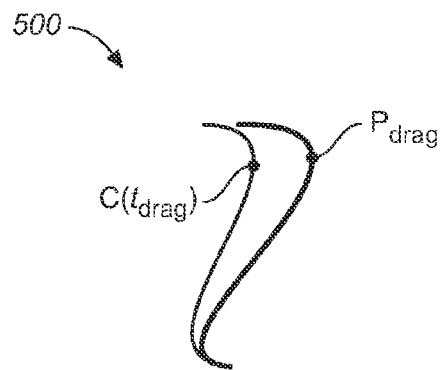
FIG. 6 illustrates direct curve manipulation.

One method for directly manipulating curves developed by Bartels and Beatty is based on the Householder equations. As shown in FIG. 6, a point on a curve 500 is dragged, and the curve 500 moves accordingly. The control points $P_i$ are modified to create a new set of points according to:

$$\Delta = P_{drag} - C(t_{drag})$$

$$\hat{P}_i = P_i + \Delta \frac{B_i^d(t_{drag})}{\sum_{i=0}^{d}(B_i^d(t_{drag}))^2}$$

The circumflex ^ is added to curves or points modified by a dragging operation. While the Bartels and Beatty method produces a smooth change in the curve, it also produces artifacts. The length of the curve is often preserved, making it difficult to flatten a curved shape. The entire curve segment is adjusted, making local changes difficult. And either the end points are left fixed, producing a large change in the overall curve near the fixed point when a small change is made, or the endpoints are allowed to move, making it difficult to constrain changes.

Based on a consideration of how the curve should behave when a target point is dragged, the following criteria work well (in the case of a cubic curve) in defining how certain canonical points on the curve should move. An equivalent set can be written for, e.g., the quadratic case.

For $t_{drag} > \frac{1}{3}$, $C(0)$ does not move.

For $t_{drag} < \frac{2}{3}$, $C(1)$ does not move

Dragging at $t_{drag}=0$ behaves just like moving the $P_0$ control point.

Dragging at $t_{drag}=1$ behaves just like moving the $P_3$ control point.

Dragging at $t_{drag}=\frac{1}{3}$ or $t_{drag}=\frac{2}{3}$ maximally effects that point on the curve.

Given end points A and B (end points A and B are two of the canonical points, and also happen, in this case, to be control points) and intermediate division points X and Y, the three sections of the Bézier are denoted AX (section 1), XY (section 2) and YB (section 3). When dragging a target point located in section 1, end point B will not move, and A, X, and Y will each move based on the position of the target point between A and X. When dragging a target point located in section 2, end points A and B will not move, and X and Y will each move based on the position of the target point between X and Y. When dragging a target point within section 3, end point A will not move, and X, Y, and B will each move based on the position of the target point between Y and B.

Figure 7:
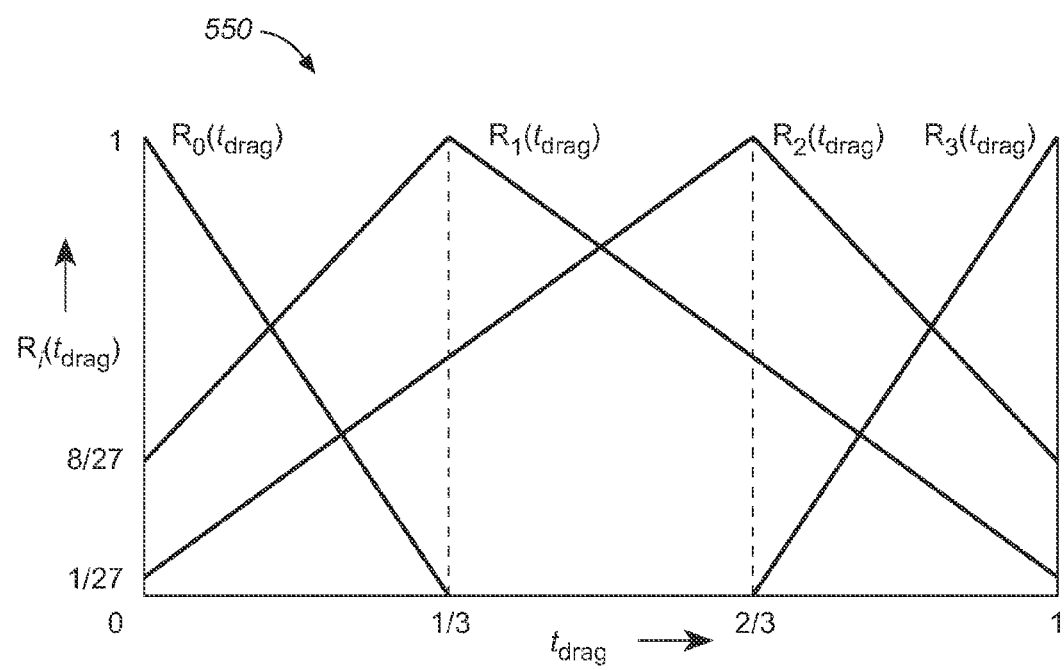
FIG. 7 shows response curves.

FIG. 7 shows how these constraints translate into adjustments of the canonical points on the Bézier curve in a graph of response curves 550. Each of the four response curves $R_i(t_{drag})$ shows the extent of motion of one of the canonical points (denoted 0, 1, 2, 3) as a percentage of the dragged position change of any arbitrary drag point along the curve C, where the $t_{drag}$ value of the selected point on the curve is on the horizontal axis, and the vertical axis shows the amount by which the end points and the section dividing points $C(i/3)$, i=0, 1, . . . , 3, on the curve (i.e., the canonical points) are affected by dragging the curve at point $C(t_{drag})$ to $P_{drag}$.

Consider the case of dragging the curve at the first end point, $t_{drag}=0$. Because (according to the third constraint above) this is the same as dragging $P_0$, the response curve $R_0$ for curve point $C(0)$ has a value of 1 at that point, which means that the point at the first end of the curve (which is the same as the target point) moves as much as the target point is dragged. The response curve $R_1$ for curve point $C(\frac{1}{3})$ has a value of $\frac{8}{27}$ at $t_{drag}=0$, because the Bézier basis function for the zeroth control point for a 3 degree curve is $\frac{8}{27}$ evaluated at $t_{drag}=0$. Thus, when the section dividing point that is ⅓ of the way along the curve is moved by a unit, the first end point of the curve moves by $\frac{8}{27}$ of a unit. In a similar way, the response curve $R_2$ for $C(\frac{2}{3})$ has a value (of the basis function) of $\frac{1}{27}$ at the first end point of the curve, and the response curve $R_3$ for $C(1)$ has a value (of the basis function) of zero at the first end point as required by the constraint above that, for $t < \frac{2}{3}$, $C(1)$ does not move.

When a target point $C(t_{drag})$ is dragged to $P_{drag}$, first compute the new positions of the end points and the section dividing points of the new curve $\hat{C}$ by applying the response curve to the original curve at:

$$\hat{C}(i/3) = \Delta R_i(t_{drag}) + C(i/3), i=0, \ldots, 3$$

Then, the new control points for the curve are determined by writing the calculation of the Bézier curve points $C(i/3)$, i=0, . . . , 3 in matrix form:

$$C^T = BP$$

where B is the basis coefficient matrix:

$$B = \begin{bmatrix} B_0^3(0) & B_1^3(0) & B_2^3(0) & B_3^3(0) \\ B_0^3(1/3) & B_1^3(1/3) & B_2^3(1/3) & B_3^3(1/3) \\ B_0^3(2/3) & B_1^3(2/3) & B_2^3(2/3) & B_3^3(2/3) \\ B_0^3(1) & B_1^3(1) & B_2^3(1) & B_3^3(1) \end{bmatrix}$$

To find the new control points, $\hat{C}(i/t)$ is substituted for $C(i/t)$ in the equation above, which is then solved for the new control points:

$$\hat{P} = \hat{C}B^{-1}$$

Because the basis coefficient matrix is constant, it can be pre-computed.

The new curve rendered from the control points will move towards $P_{drag}$ but may not actually reach it. In an interactive program, this is often not noticeable, because the constraint will be satisfied on the next iterations of the mouse tracking loop. However, it is possible to avoid this behavior in a manner described later.

Figure 8:
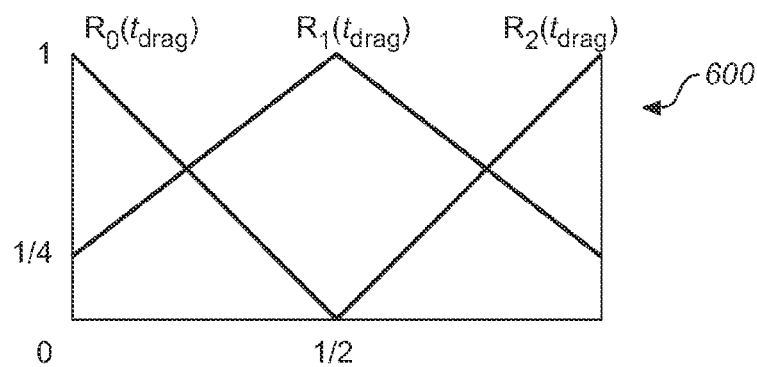
FIG. 8 shows quadratic response curves.

The curve dragging method is extended to non-cubic curves by creating new response curves $R_i$ for points on the curve at C(i/d), i=0, . . . , d. For example, in FIG. 8, response curves 600 for a quadratic curve are shown. When the curve dragged is part of a multiple-segment Bézier curve, the curve continuity should be maintained by keeping the control points on the adjoining segments co-linear with the ones on the dragged segment, and at the same distance.

Extending the methods described above to surfaces provides an intuitive, natural way to edit the distortion surfaces described previously. A distortion surface of the kind shown in FIG. 5 can be described as:

$$S(u, v) = \sum_{i=0}^{n} \sum_{j=0}^{m} V_{i,j} B_j^m(u) B_i^n(v)$$

where u, v are the parameters of the surface, $V_{i,j}$ is the (n+1) X (m+1) mesh of control points, and $B_j^m(u)B_i^n(v)$ are the Bézier basis functions of degree m, n as described above. The goal of the free-form manipulation is to drag an arbitrary point on the surface $S(u_{drag}, v_{drag})$ to $P_{drag}$ in a similar fashion to the curve manipulation method described above.

Figure 9:
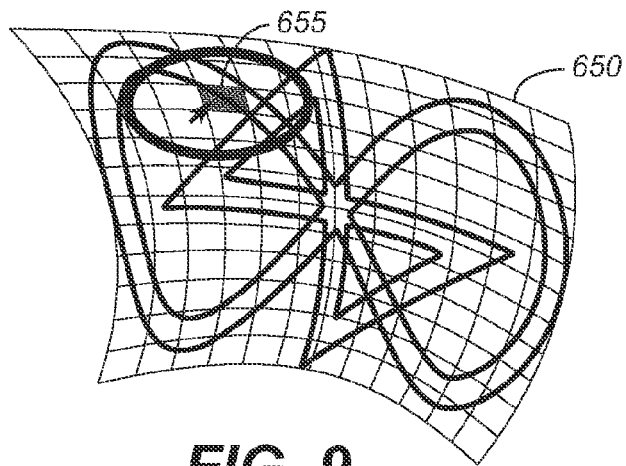
FIGS. 9 and 10 illustrate sampling to determine surface parameters.
Figure 10:
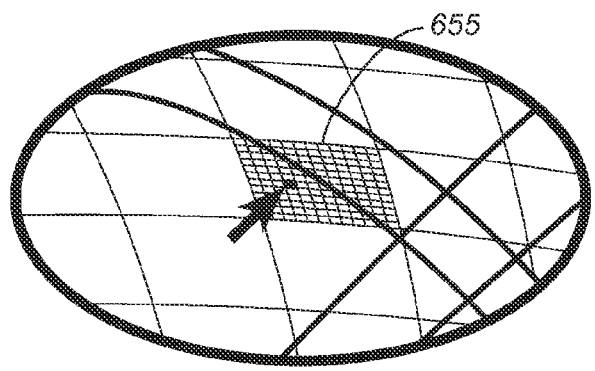

To drag a point on the surface, the parameters $u_{drag}$, $v_{drag}$ of the selected point on the surface should be determined, given the selected target point $P_{sel}$, so that $S(u_{drag}, v_{drag})$ is approximately equal to $P_{sel}$. As shown in FIGS. 9 and 10, to accomplish this, a distortion surface 630 can be first coarsely sampled in uniform steps in u and v. A typical sampling rate of 4(n+1)×4(m+1) can be used across the entire surface 630. By connecting points adjacent to each other in the parameter space, the resulting sample points form a mesh of quadrilaterals covering the surface. Each quadrilateral is checked to see if it contains $P_{sel}$, by checking $P_{sel}$ against the line equations of the four borders of the quadrilateral (the lines are formed by proceeding around the quadrilateral in a consistent direction, e.g., clockwise). If $P_{sel}$ is on the same side of all four lines, then it lies inside. If $P_{sel}$ is found to lie inside one of the quadrilaterals 650, then the process is repeated, except this time the sampling is done over the parameter range for just that quadrilateral 655 rather than the entire surface. The indices of the sample points containing $P_{sel}$, are used to determine the parameters $u_{drag}$, $v_{drag}$. While this process can be repeated indefinitely to improve accuracy, in practice two iterations are sufficient for interactive manipulation.

Figure 11:
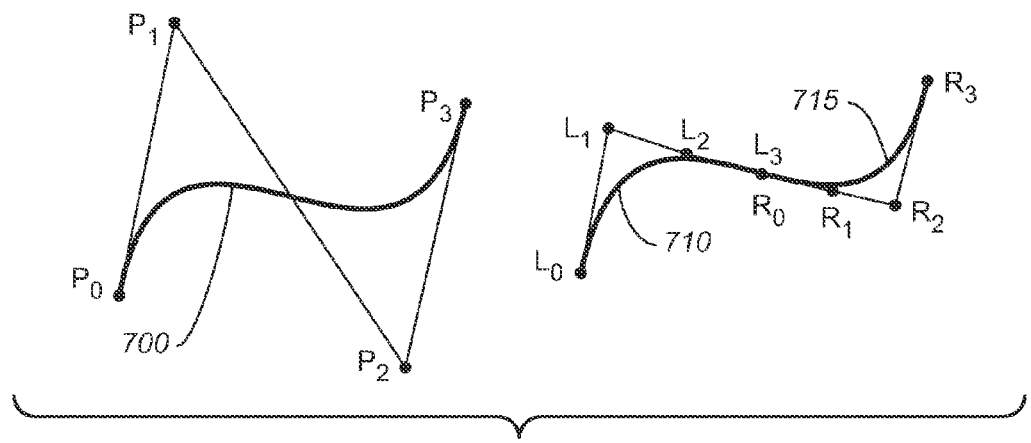
FIG. 11 illustrates curve subdivision.
Figure 12:
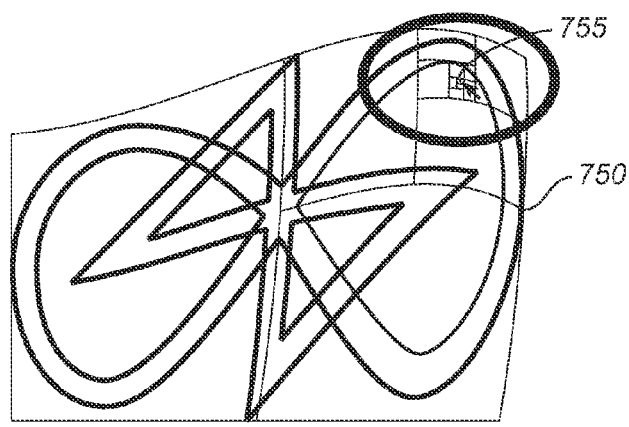
FIGS. 12 and 13 illustrate subdivision to determine surface parameters.
Figure 13:
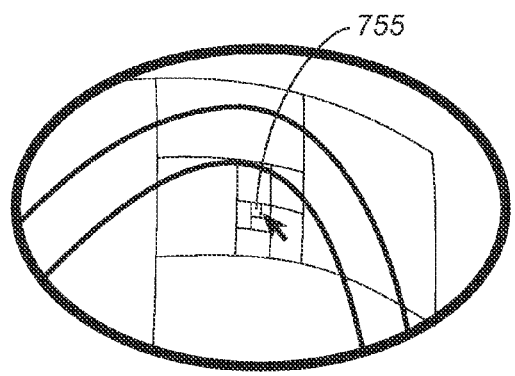

An alternative technique for determining the parameters of a drag point corresponding to a user-selected point on the surface is illustrated in FIGS. 11-13. FIG. 11 illustrates curve subdivision. A Bézier curve C(t) 700 can be subdivided into two joined curves L(t) 710 and R(t) 715 by computing two new sets of control points from the original set using the following:

$$L_i(t) = \sum_{j=0}^{i} \frac{P\binom{i}{j}}{2^i}$$

$$R_i(t) = \sum_{j=i}^{d} \frac{P_{i+j}\binom{d-i}{d-j}}{2^{d-i}}$$

The two new curves are the same shape as the original, and $L_d$ and $R_0$ have the same value. To split a Bézier surface, the same technique can be applied to each row of control points to split along the u parameter or each column of control points to split along the v parameter.

FIGS. 12 and 13 illustrate subdivision to determine surface parameters. To find the parameters u and v corresponding to a user-selected point on a surface 750, the surface can be recursively subdivided. A test can be made to see if the user-selected point is within the bounding box of the control points of each subdivided surface half. If it is, the subdivision continues recursively on that half. At each subdivision, the parametric bounds of the subsurface is recorded. This process continues until the size of the bounding box 755 becomes approximately the same size as a single pixel of the display device. At this point, the center of the parametric bounds of the subsurface provide a good approximation to the parametric coordinates of the selected point.

Figure 14:
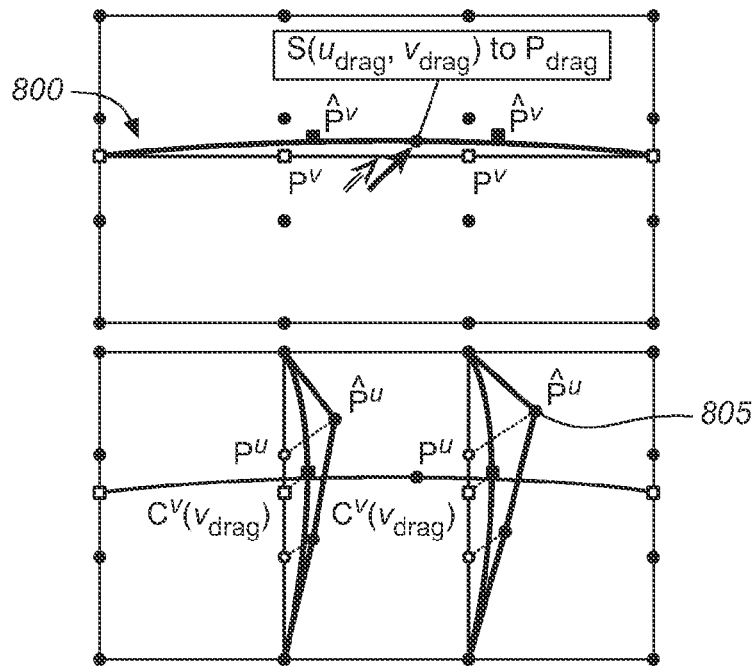
FIG. 14 illustrates treatment of a surface drag as a series of curve drags.

Applying the drag method to the surface proceeds in two steps as shown in FIG. 14. First the drag is applied to the iso-curve 800 at $v_{drag}$. Then, each of the control points of this iso-curve 800, such as a control point 805, is used as a $P_{drag}$ for modifying the curves formed by the columns of control points in the surface. Because the surface drag is developed as a series of curve drags, it is useful to express the curve manipulation method described above for dragging the point $C(t_{drag})$ to $P_{drag}$ as a function that generates a new set of curve control points from the original control points P:

$$P = \text{Drag}(P, t_{drag}, \Delta)$$

where $$\Delta = P_{drag} - C(t_{drag})$$

he iso-curve at $v_{drag}$ $C^v$ is formed by control points $P^v$ computed via:

$$P_v^j = \sum_{i=0}^{n} V_{i,j} B_j^n(v_{drag}), j = 0 \ldots m$$

A new set of control points for this iso-curve is computed with:

$$\hat{P} = \text{Drag}(P^v, u_{drag}, P_{drag} - S(u_{drag}, v_{drag}))$$

Figure 15:
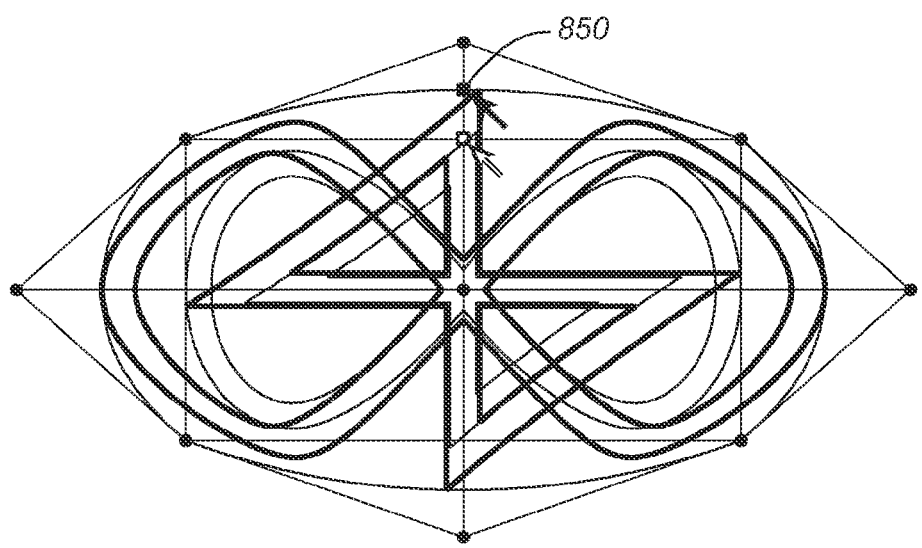
FIG. 15 illustrates a direct manipulation of an "inflate" distortion.

The control points for this new curve are used to drag the columns of the control points by applying them to the surface control points:

for j=0 . . . m
 $P_i^u = V_{i,j}$, i=0 . . . n
 $\hat{P}^u = \text{Drag}(P^u, v_{drag}, \hat{P}_j^v - P_j^v)$
 $V_{i,j} = \hat{P}_i^u$, i=0 . . . n The methods described above are useful for free-form manipulation of the distortion surface to produce an arbitrary shape. However, there are many cases where it is useful to produce distortions with a symmetric shape, where the manipulation is confined to a single parameter. Consider an inflate pre-defined distortion as shown in FIG. 15. In this case, as the parameter is changed, the edges of the distortion move in or out. The inflate distortion is a bi-quadratic. The amount of distortion is controlled by a single parameter, which moves the control points on the center of each edge towards (or away from) the center of the mesh. While this manipulation can be done with a traditional user interface tool such as a slider control, another approach is to provide a handle 850 oh the surface that the user drags to the desired shape, subject to the constraints of the symmetry. This closely matches the free-form dragging behavior described above, and makes the surface editing more precise, easier to learn, and easier to use.

To provide this control, a method is needed to convert the movement of the mouse (in one dimension) into a corresponding movement amount for the symmetric movement of the control points in the distortion. This generally involves modifying the surface equation (see above) to incorporate the desired symmetric movement, and then solving that equation for the amount to move the control points.

Continuing with the inflate distortion example, a handle is placed at $S(\frac{1}{2},0)$. This handle is constrained to move only vertically and should track the top of the distortion. To simplify the problem, consider just the top iso-curve of the surface (v=0, $V_{0,0\ ..2}$). As the handle is dragged, the control point $V_{0,1}$ should move so that the point on the curve $S(\frac{1}{2},0)$ tracks the mouse as it moves. To find out how far $V_{0,1}$ should move so that the handle tracks the curve, consider the formulation of the curve (with u=½, and ignoring v for the moment):

$$S(1/2, 0) = \frac{1}{4}V_{0,0} + \frac{1}{2}V_{0,1} + \frac{1}{4}V_{0,2}$$

With $V_{0,0}$ and $V_{0,2}$ fixed, we can see that $V_{0,1}$ moves twice as far as the point on the curve $S(\frac{1}{2},0)$. Thus, when the handle at $S(\frac{1}{2},0)$ is dragged, the four control points on the edges are moved twice the distance the handle was moved, giving the illusion that the handle is fixed onto the edge of the distortion.

Figure 16:
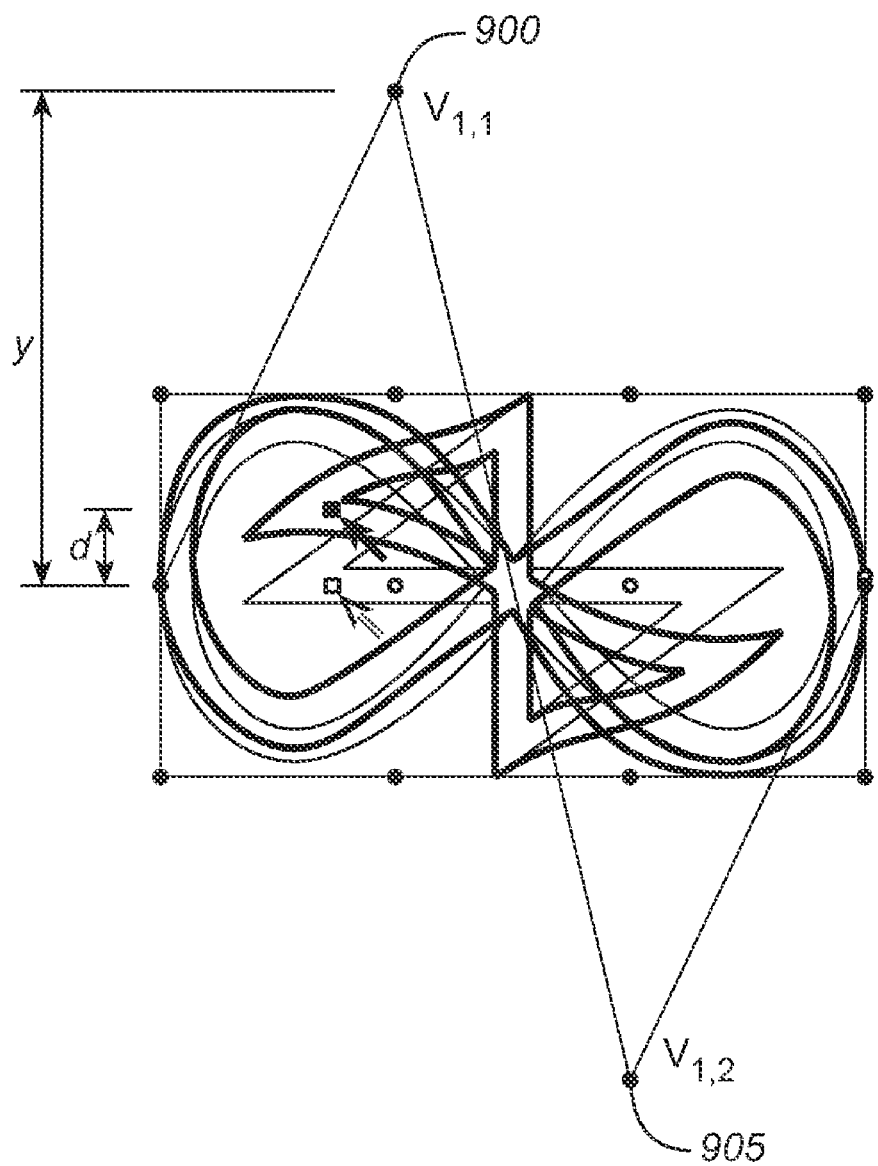
FIG. 16 illustrates a wave distortion.

As a second, more complex example, consider the wave distortion shown in FIG. 16. When the single parameter of this distortion is changed, a left interior control point 900 moves up, and a right interior control point 905 moves down in equal amounts. If y is the wave amount, then the distortion is determined by:

$$V_{1,1} = c+y$$

$$V_{1,2} = c-y$$

where c is the vertical coordinate of the center of the distortion's bounding box. ($V_{i,j}$; refers to just they coordinate $V_{i,j}$; because the x coordinates are not affected they may be ignored). To give maximum control, the handle should start out at $S(\frac{1}{4},\frac{1}{2})$. As this handle is dragged up or down, we want it to track the surface, with $V_{1,1}$ moving in the same direction as the handle and $V_{1,2}$ moving in the opposite direction. To do this, we need to find the value corresponding to the difference between the original handle location at $S(\frac{1}{4},\frac{1}{2})$ and $P_{drag}$. If we call this difference d, and the corresponding distance the control points $V_{1,1}$ and $V_{1,2}$ each move y, we find d is related to y via the equation:

$$d = P_{drag} - S_y(u, v)$$

$$d = B_0^2(v)\sum_{j=0}^{3} V_{0,j}B_j^3(u) + B_1^2(v)(V_{1,0}B_0^3(u) + yB_1^3(u) - yB_2^3(u) +$$

$$V_{1,3}B_3^3(u)) + B_2^2(v)\sum_{j=0}^{3} V_{2,j}B_j^3(u)$$

Solving for y gives:

$$y = \frac{d - B_0^2(v)\sum_{j=0}^{3} V_{0,j}B_j^3(u) - B_2^2(v)\sum_{j=0}^{3} V_{2,j}B_j^3(u) -}{B_1^2(v)(B_1^3(u) - B_2^3(u))}$$

$$\frac{V_{1,0}B_0^3(u)B_1^2(v) + V_{1,3}B_3^3(u)B_1^2(v)}{B_1^2(v)(B_1^3(u) - B_2^3(u))}$$

Collecting terms and substituting u=¼, v=½ gives:

$$y = \frac{256d - 27(V_{0,0} + 2V_{1,0} + V_{2,0}) - 27(V_{0,1} + V_{2,1}) -}{9(V_{0,2} + V_{2,2}) - (V_{0,3} + 2V_{1,3} + V_{2,3})} \quad (36)$$

This is the equation relating the mouse movement d to the control point movement y.

Other direct controls for pre-defined distortions can follow the same general strategy of relating the mouse movement to a point on the surface. Distortions can also have multiple handles (e.g., one for a vertical stretch and another for horizontal) with the implementation strategy being applied to each handle.

As mentioned, the method described above for free-form manipulation of the distortion of the surface using a point on the surface does not adjust a curve sufficiently in a single iteration to move a target point by an amount indicated by dragging. However, the method can be enhanced to move the point by the required amount in a single step. Below we discuss how this is done for the cubic case. The same approach can be applied to the quadratic case.

In the basic method the desired displacements of four canonical points on the curve, at t=0, ⅓, ⅔, and 1, are specified by the response curves for four specific choices of the dragged point, $t_{drag}$=0, ⅓, ⅔, and 1. The behavior of the four on-curve canonical points for other values of $t_{drag}$ was derived by linear interpolation as shown by the linear segments of the response curves. Although linear functions are easy to compute, the result of the choice of linear interpolation is that the dragged point may not be displaced by the correct amount.

Among the possible methods for interpolating behavior for intermediate values of $t_{drag}$, a set of scaled response curves, $S_1$ derived in a manner explained below, works well. Starting with the response curves, $R_i$, of the basic method, we find the resulting displacement of the Bézier control points, and of the point, $t_{drag}$. The point, $t_{drag}$, will have moved a fraction, f, of the required distance. We therefore scale the displacements of the Bézier control points by the factor 1/f. The linear nature of the whole system ensures that this will result in the point, $t_{drag}$, being displaced by the correct amount.

By making different choices of the response curves we can generate different corrected response curves. These different choices will affect the relative amounts by which the various control points move.

The correction may be implemented by literally coding the correction operations as described. Alternatively, the appropriate correction can be derived algebraically, as explained below.

We use the following scaled response curves notation (there has been some reuse of variable names that were previously used for other purposes in the earlier discussion):

$C(t)$—Position of point on Bezier curve and t
$\Delta C(t)$—Change in position of point on Bezier curve at t
$\Delta CV - [\Delta C_{(0)} \Delta C_{(1/3)} \Delta C_{(2/3)} \Delta C_{(t)}]$—Vector of curve points at $t=0$, $1/3$, $2/3$, $1$
$P_i$, $i=0 \ldots 3$—Position of Bezier control point i
$\Delta P_i$, $i=0 \ldots 3$—Change in position of Bezier control point i
$P = (P_0 P_1 P_2 P_3)$—Row vector of $\Delta P_i$
$\Delta P = (\Delta P_0 \Delta P_1 \Delta P_2 \Delta P_3)$—Row vector of $\Delta P_i$
$R_i(t_{drag})$, $i=0 \ldots 3$—Value of Response Curve at $t_{drag}$
$R(t_{drag}) - (R_0(t_{drag}) R_1(t_{drag}) R_2(t_{drag}) R_3(t_{drag}))$—Row vector of $R_i(t_{drag})$
$S_i(t_{drag})$, $i=0 \ldots 3$—Value of Scaled Response Curve at $t_{drag}$
$S(t_{drag}) - (S_0(t_{drag}) S_1(t_{drag}) S_2(t_{drag}) S_3(t_{drag}))$—Row vector of $S_i(t_{drag})$
M—Bezier coefficient matrix
$T(t) = (1 \; t \; t^2 t^3)$—Row vector of powers of t
$T(t)^t$—Transpose of $T(t)$
A—Power matrix
$\Delta L$—Vector through which pointing Locator is dragged
$B^n$—Vector of Bezier basis functions of degree n The position of a point, $C(t)$, on a Bézier curve is given by $$C(t) = P.M.T(t)^T \quad (EQ\ 1)$$

where $$M = \begin{bmatrix} 1 & -3 & 3 & -1 \\ 0 & 3 & 6 & 3 \\ 0 & 0 & 3 & -3 \\ 0 & 0 & 0 & 1 \end{bmatrix}$$

The change, $\Delta C(t)$, in position of a point for a given change, $\Delta P$, in the positions of the control points is $$\Delta C(t) = \Delta P.M.T(t)^T \quad (EQ\ 2)$$

Applying this to the four canonical points, $t=0$, $1/3$, $2/3$, $1$ $$[\Delta C(0) \Delta C(1/3) \Delta C(2/3) \Delta C(1)] = \Delta CV = \Delta P.M.A \quad (EQ\ 3)$$

where $$A = \begin{bmatrix} 1 & 1 & 1 & 1 \\ 0 & \frac{1}{3} & \frac{2}{3} & 1 \\ 0 & \frac{1}{9} & \frac{4}{9} & 1 \\ 0 & \frac{1}{27} & \frac{8}{27} & 1 \end{bmatrix} \quad (EQ\ 4)$$

is obtained by substituting the values $t=0$, $1/3$, $2/3$, $1$ into the column $T(t)^T$, expressed as a matrix.

From equation 3, the change in position of the control points required to achieve a change in position of the four canonical points on the curve is $$\Delta P = \Delta CV.A^{-1}.M^{-1} \quad (EQ\ 5)$$

where $$A^{-1} = \begin{bmatrix} 1 & -\frac{11}{2} & 9 & -\frac{9}{2} \\ 0 & 9 & -\frac{45}{2} & \frac{27}{2} \\ 0 & -\frac{9}{2} & 18 & -\frac{27}{2} \\ 0 & 1 & \frac{9}{2} & \frac{9}{2} \end{bmatrix} \text{ and } M^{-1} = \begin{bmatrix} 1 & 1 & 1 & 1 \\ 0 & \frac{1}{3} & \frac{2}{3} & 1 \\ 0 & 0 & \frac{1}{3} & 1 \\ 0 & 0 & 0 & 1 \end{bmatrix}$$

The changes in position of the canonical curve points, $\Delta CV$, is determined from the response curves $$\Delta CV = \Delta L.R(t drag) \quad (EQ\ 6)$$

Substituting into equation 5

$$\Delta P = \Delta L.R(t_{drag}).A^{-1}.M^{-1} \quad (EQ\ 7)$$

This is essentially the formulation used in the basic method. Now we examine how a point, t, on the curve is affected.

Combining equation 2 and equation 7

$$\Delta C(t) = \Delta L.R(t_{drag}).A^{-1}.T(t)^T \quad (EQ\ 8)$$

This shows that the displacement, $\Delta C(t)$, of the point t on the curve is a scale factor, $R(t_{drag}).A^{-1}T(t)^T$, times the movement, $\Delta L$, of the locator. In particular $$\Delta C(t_{drag}) = \Delta L.R(t_{drag}).A^{-1}.T(t_{drag})^T \quad (EQ\ 9)$$

To ensure that the $C(t_{drag})$ stays with the locator we require $\Delta C(t_{drag}) = \Delta L$. We therefore need to modify the scale factor by $1/(R(t_{drag}).A^{-1}.T(t_{drag})^T)$ This can be achieved by scaling the response curves to give the scaled response curves, $S(t)$, where $$S(t_{drag}) = R(t_{drag})/(R(t_{drag}).A^{-1}.T(t_{drag})^T) \quad (EQ\ 10)$$

The revised expression for computing changes, $\Delta P$, in the positions of the Bézier control points for a given displacement, $\Delta L$, of the locator at point $t_{drag}$ on the curve is, from equation 7:

$$\Delta P = \Delta L.S(t_{drag}).A^{-1}.M^{-1} \quad (EQ\ 11)$$

Figure 17:
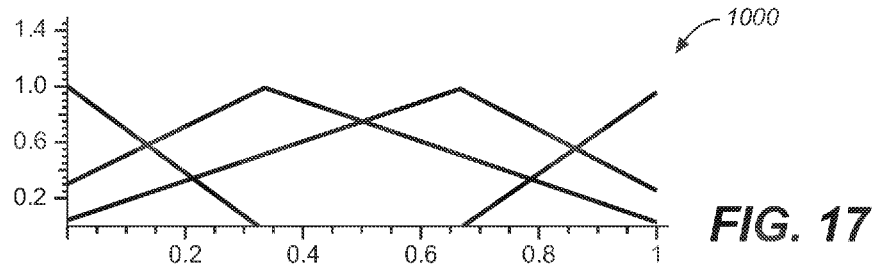
FIG. 17 shows linear response curves.
Figure 18:
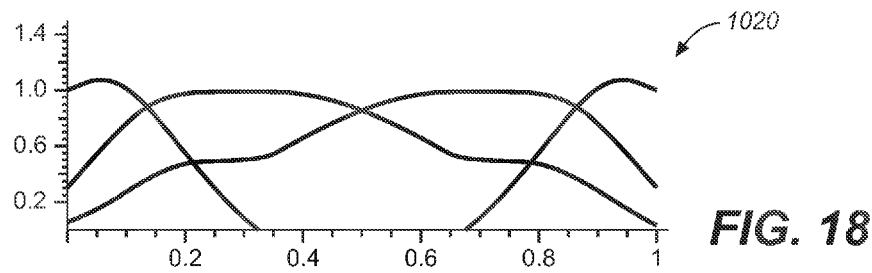
FIG. 18 shows scaled response curves.

The choice of $R(t_{drag})$ used in the basic method is shown in FIG. 17 as a graph of response curves 1000. The corresponding scaled response curves are shown in FIG. 18 as a graph of response curves 1020.

Figure 19:
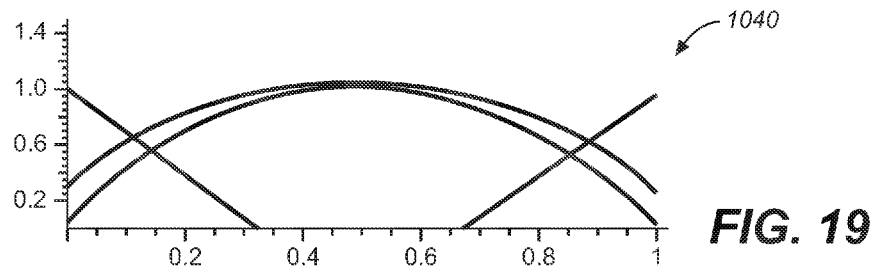
FIG. 19 shows linear response curves.

While the curves of FIG. 17 work well in an interactive environment, the discontinuity of slope in $S_1$ ($t_{drag}$) at $t_{drag} = 1/3$, and similarly in $S_2$ ($t_{drag}$), may be considered undesirable. This can be fixed by making a different choice of $R_1$ ($t_{drag}$) and $R_2$ ($t_{drag}$). For example, FIG. 19 shows a graph of response curves 1040 for the case of a two-degree curve; response curves in which $R_1$ ($t_{drag}$) and $R_2$ ($t_{drag}$) are $2^{nd}$ degree polynomials interpolating the same boundary conditions:

$$R_1(t_{drag}) = 8/27 + t \cdot 89/27 + t^2 \cdot 32/9$$

$$R_2(t_{drag}) = R_1(1 - t_{drag})$$

Figure 20:
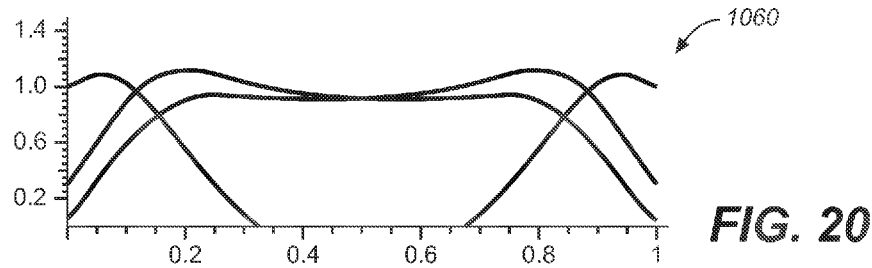
FIG. 20 shows scaled response curves.

The corresponding scaled response curves are shown in FIG. 20 as a graph of response curves 1060.

The treatment given here may be applied directly to Bézier curves of degree other than three. Differences include the size of the various vectors and matrices, the coefficients in the Bézier coefficient matrix, M, and the boundary conditions for the response curves. For degree 2 curves (quadratic), the boundary conditions require that for t drag<½, the end of the curve, C(1), does not move, and similarly for t drag>½ with respect to end C(0). See FIG. 8.

The linear case is the same as a linear (degree one) example proposed by Bartels and Beatty.

When the end, t drag=0, of a curve is moved, the treatment given here causes the curve to distort as if only the control point, $P_0$, were moved—all other control points remain fixed. This is not always desirable. For example, the curve may be part of a composite curve, consisting of many Bézier segments connected end-to-end, with slope continuity between segments. In this case, moving the end of a curve segment should move not only the control point, $P_0$, but also the adjacent control point $P_1$. This will have the effect of maintaining the slope of the end of the curve. If the same treatment is given to the adjoining curve segment, whose end is also being dragged at the same time, then continuity of slope is maintained. This behavior can be incorporated into the present scheme by modifying the boundary conditions on the response curves, as follows:

$$R_1(0)=R_2(1)=B_0^3(\tfrac{1}{3})+B_1^3(\tfrac{1}{3})=20/27$$

$$R_1(1)=R_2(0)=B_0^3(\tfrac{2}{3})+B_1^3(\tfrac{2}{3})=7/27$$

This gives rise to the following response curves:

$$R_0(t_{drag})=\text{if } (t_{drag}<\tfrac{1}{3}) \text{ then } (1-3\cdot t_{drag}) \text{ else } (0)$$

$$R_1(t_{drag})=\text{if } (t_{drag}<\tfrac{1}{3}) \text{ then } (20/27+t_{drag}\cdot 21/27) \text{ else } (37/27-t_{drag}\cdot 30/27)$$

$$R_2(t_{drag})=R_1(1 t_{drag})$$

$$R_2(t_{drag})=R_0(1 t_{drag})$$

Corresponding scaled response curves can be derived, from these expressions using equation 10.

In any given implementation, both forms of boundary conditions might be used. The original form may be appropriate for ends of composite curves, or for moving interior segment ends where slope continuity is not required. This new set of response curves is more appropriate for interior segment ends where slope continuity is required. The remaining question concerns maintenance of slope continuity between joined Bézier segments when t drag>0, because the adjacent segment will not normally be affected. Two strategies present themselves. Both involve repositioning the adjacent slope control point of the adjacent segment so that it is co-linear with the end point and slope point of the current segment. One strategy would maintain the length of the adjacent slope vector. The other would maintain the ratio of the magnitudes of the slope vectors at the adjoining ends.

Additional details regarding the above-described example techniques for receiving an image distortion description can be found in U.S. Utility patent application Ser. No. 09/458, 917, filed Dec. 10, 1999 and entitled "MANIPULATION OF CURVES AND SURFACES", which is hereby incorporated by reference.

Figure 21:
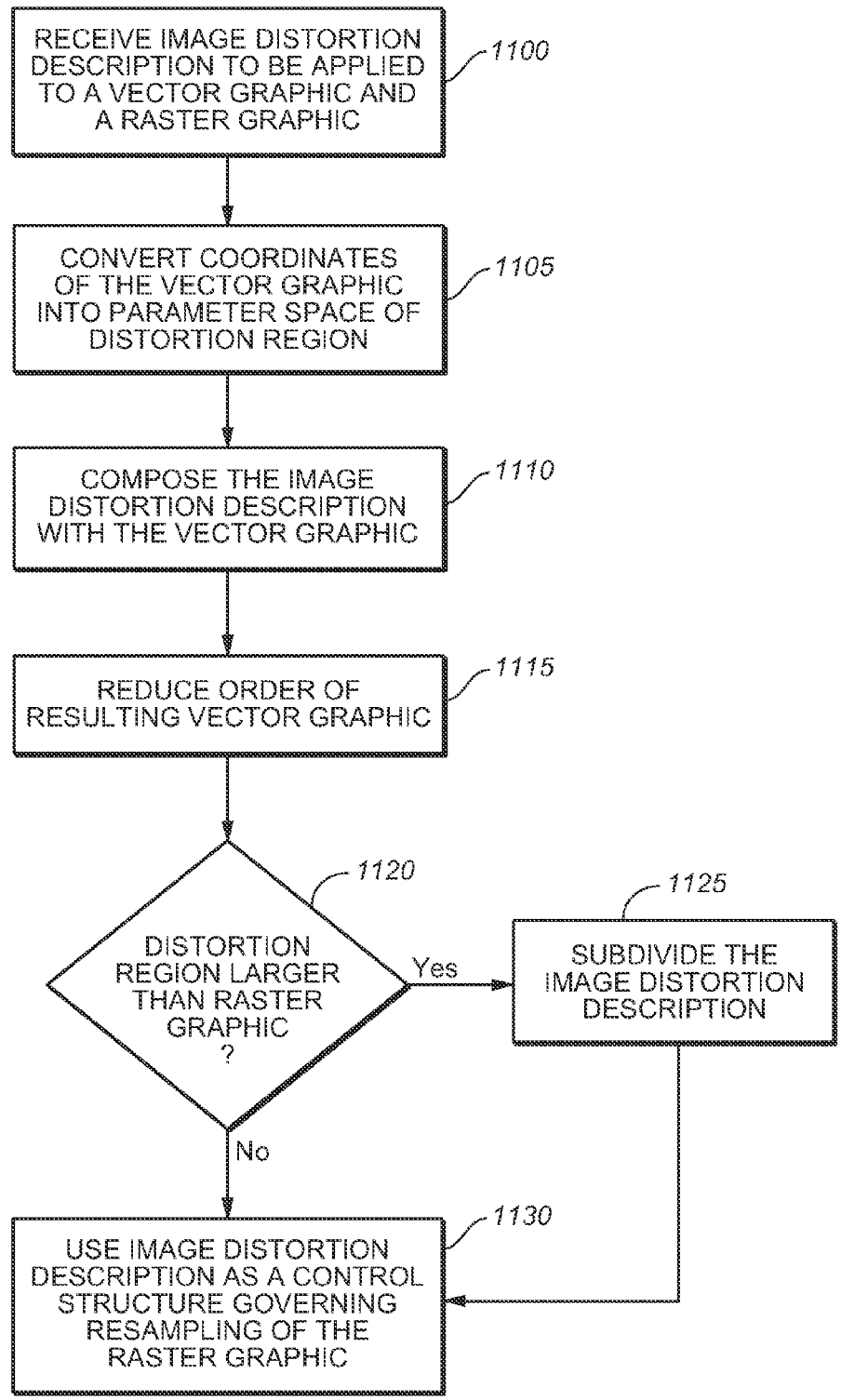
FIG. 21 is a flowchart showing a process of distorting a raster graphic and a vector graphic.

FIG. 21 is a flowchart showing a process of distorting a raster graphic and a vector graphic. An image distortion description is received at 1100. The image distortion description is to be applied to an image portion including a vector graphic and a raster graphic. The image portion can be part of image artwork or an entire image itself. The raster graphic is distortable separate from the vector graphic. The raster graphic need not have a predefined mapping association with a vector graphic, as in the case of texture mapping in three-dimensional modeling.

The coordinates of the vector graphic are converted into a parameter space of the distortion region at 1105. The image distortion description is composed with the vector graphic at 1110. This composition of functions allows curve information to be retained as curve information and maintains a resolution independent aspect of the vector graphic. The result of this composition can be a function having an order higher than acceptable. Thus, the resulting vector graphic can have its order reduced at 1115. Additional details regarding techniques for distorting vector graphics are described below in connection with FIG. 22.

Before the raster graphic is distorted, a check is made to determine if the distortion region is larger than the raster graphic at 1120. This will be the case when one of the vector graphics to be distorted is not entirely contained in the raster graphic, and also when multiple raster graphics are to be distorted. If the distortion region is larger, the image distortion description is subdivided at 1125. After subdivision of the image distortion description, or if the distortion region is not larger than the raster graphic, the image distortion description is used as a control structure governing resampling of the raster graphic at 1130. Additional details regarding techniques for distorting raster graphics are described below in connection with FIGS. 23-26.

Figure 22:
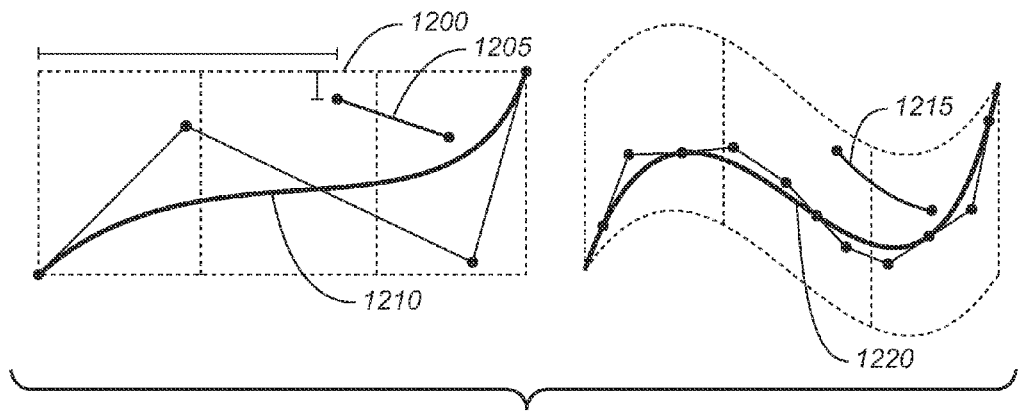
FIG. 22 illustrates a technique for distorting vector graphics.

FIG. 22 illustrates a technique for distorting vector graphics. In this example, an undistorted tensor product Bézier mesh 1200 is first placed over the distortion region (e.g., the bounding box) of the objects to be distorted. The coordinates of each point defining the vector artwork (e.g., endpoints of line segments, or control points of curves) are converted into the local parameter space of the distortion region. As shown in FIG. 22, a line 1205 and a cubic Bézier curve 1210 are distorted. The distortion region has a parameter space from 0.1 in both directions, so the endpoints of the line 1205 can be specified for the distortion in coordinates relative to the overall size of the distortion (e.g., values between 0.0 and 1.0).

A simple method for distorting the artwork is to sample curve or line segments at many small steps along their length. The resulting sample points are converted into the parameter space of the distortion region, and used as parameters for the distortion. For example, if C(t) is a function representing the line or curve, and D(u,v) is a function representing the distortion, then points on the distorted curve are found by evaluating $D(C_x(t),C_y(t))$. This technique can be simple to implement, but generally generates a good deal of data and also discretizes the curves, making them no longer resolution independent.

An alternative approach involves treating the definition of a curve or line as a mathematical function C(t), and treating the image distortion description as another function D(u,v), as before. The two functions are then composed: H=D∘C. Example techniques for composing such functions are described in DeRose, Goldman, Hagen & Mann, "Functional Composition Algorthims via Blossoming" ACM Transactions on Graphics, Vol. 12 No. 2, April 1993, pp 113-135.

The function H(t) resulting from the composition is a higher order curve that represents the distorted original. Since typical output device systems are currently unable to render high order curves directly, additional control points can be created as needed to match the original shape, creating new distorted vector graphics, such as a warped line 1215 (which can be cubic Bézier curve) and a warped cubic Bézier curve 1220. Example techniques for reducing the order of such resulting functions are described in Watkins & Worsey, "Degree Reduction of Bézier Curves", Computer Aided Design, Vol. 20 No. 7, September 1988, p. 398.

Figure 23:
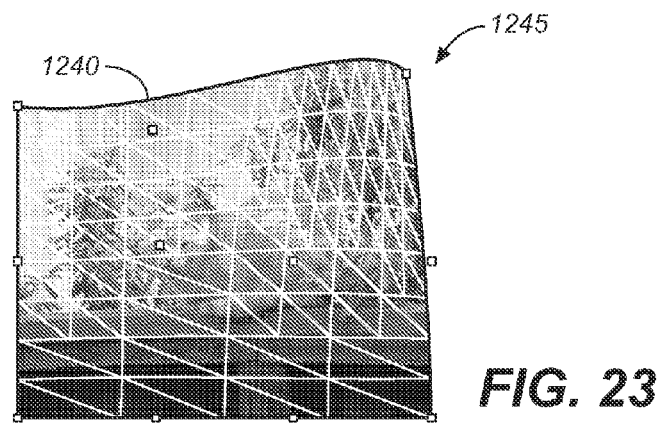
FIGS. 23 and 24 illustrate a technique for distorting a raster graphic.
Figure 24:
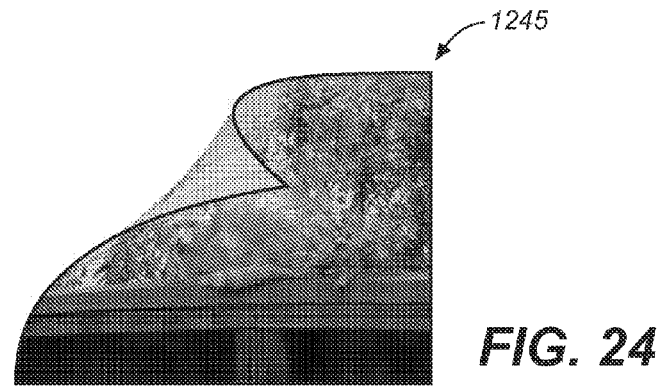

FIGS. 23 and 24 illustrate a technique for distorting a raster graphic. Distortion of a raster graphic is essentially a resampling problem. Because the distorted image is no longer aligned with the pixel grid, the underlying abstract image is sampled on the new pixel grid of the distorted image. One way to do this is to tessellate the image distortion description, and then resample the raster graphic based on the tessellated image distortion description.

A specified distortion 1240 of a raster graphic 1245 can be recursively subdivided. This recursively splits the distortion space into adjoining polygons (e.g., rectangles, triangles). The subdivision process continues until the polygons are sufficiently small that they form a close approximation of the distorted shape of the frame of the original image (e.g., the polygons have less than a pixel unit's distortion). As the subdivision progresses, the parametric coordinates of the vertices of the polygons are recorded. These can be used to map the image pixels from the original shape onto the distorted shape.

The subdivision can occur in two stages. First, the distortion 1240 can be subdivided into rectangles, until each of the rectangles holds less than a pixel unit's distortion. Example techniques that can be used to recursively subdivide the specified distortion 1240 are described in Peterson, "Tessellation of NURB Surfaces", in Graphics Gems IV, P. Heckbert (ed), 1994 Academic Press, p. 286. The techniques described in the Peterson paper can be simplified because the coordinates here are two-dimensional instead of three-dimensional, and because a simple Bézier mesh can be used instead of a Non-Uniform Rational B-Spline one. Once this subdivision process is complete, the resulting polygons can be further split into triangles or shards. These shards are then scan converted back into pixels. Various example techniques for scan converting shards into pixels are described in Heckbert, "Fundamentals of Texture Mapping and Image Warping", MS Thesis, UC Berkeley, UC Berkeley report UCB/CSD 89/516, and also in Heckbert, P., "Generic Convex Polygon Scan Conversion and Clipping", in (A. Glassner, Ed.) Graphics Gems, Academic Press, 1990, p. 84.

The specified distortion of the raster graphic 1245 can cause the image to fold over itself as shown in FIG. 24. This type of distortion can be allowed as well. For example, the triangles generated by the subdivision described above can be generated in a relatively arbitrary order (e.g., the depth-first order of the subdivision process), which may not correspond to their layout in the distorted image. When the specified distortion causes the image to fold over itself, an analysis of the generated vertices can be used to allow for this folding over.

Figure 25:
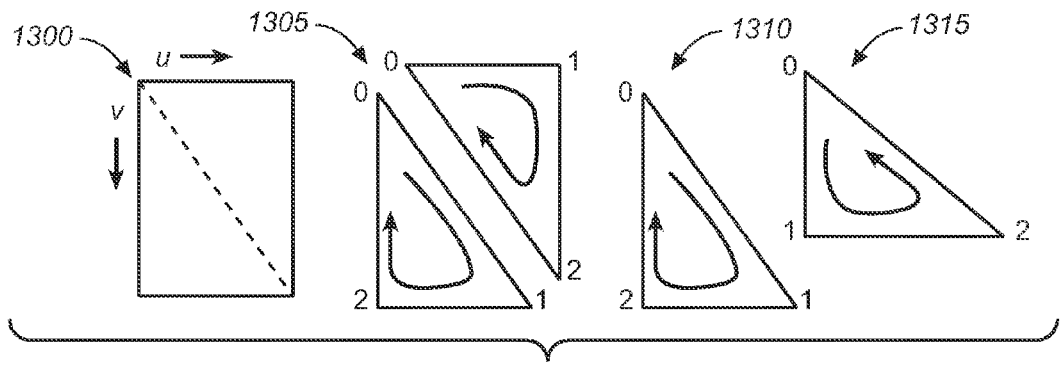
FIG. 25 is a block diagram illustrating example subdivision of a specified distortion and ordering of vertices.

FIG. 25 is a block diagram illustrating example subdivision of a specified distortion and ordering of vertices. A final subdivided piece 1300 has corners with two sets of coordinates: (1) original image coordinates, typically referred to as u and v, and (2) distortion image coordinates (e.g., the x and y coordinates of the display device). When the final subdivided piece 1300 is split into shards 1305, the vertices of the shards can be ordered in terms of the orientation in the original image space, as shown in FIG. 25. A shard can be determined as either forward facing or backward facing (i.e., folded over) by examining the orientation of the shard's vertices as they appear in the final display. In the original parameter space, the vertices of each shard are arranged in a clockwise order, as with a shard 1310. If the vertices appear in counter-clockwise order when they are finally rendered, like those of a shard 1315, then the shard is backfacing. The orientation can be determined by examining the sign of the cross product of the vectors: $(P_0-p_1) \times (p_2-p_1)$, here $p_i$ refers to the distortion image coordinates of the shard vertices.

Before the shards are rendered, they can be first sorted so that the folded over shards are displayed last, if it is desired to display the folded over portion, or first if the folded over portion should be obscured. Additionally, the shards can be sorted within the backfacing and frontfacing by their distance in the original parameter space from the origin 0–u, v=0. This can help disambiguate situations where two corners fold over on each other.

When the shards are rendered, a resampling process can be used to render the pixels from the original image through the specified distortion into the distorted image (e.g., the device pixels). This can be done by interpolating the values between the source image pixels to compute the values of the destination pixels. An example such a resampling process can be found in Williams, "Pyramidal Parametrics", Proc. of SIGGRAPH '83. However, this process may not be possible at the edge of the image, because there are no values to interpolate to beyond the edge of the image.

Figure 26:
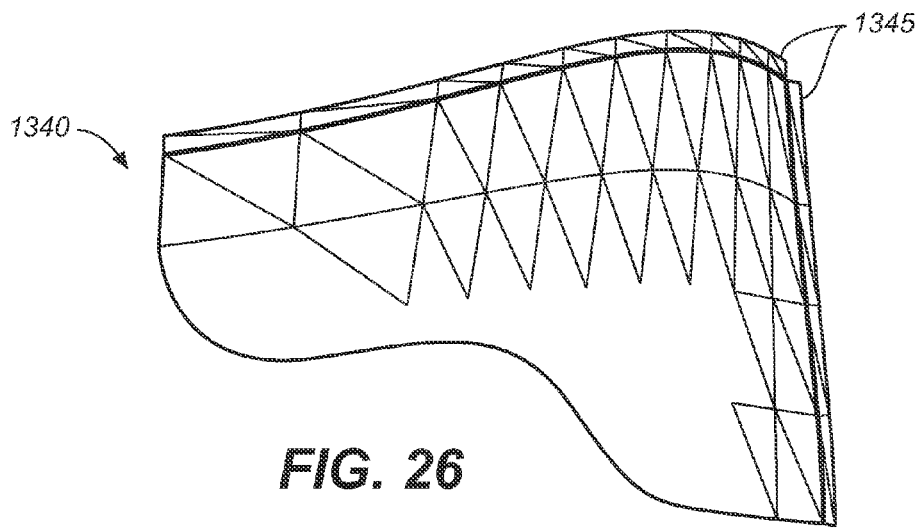
FIG. 26 illustrates generated edge shards for handling image edges.

FIG. 26 illustrates generated edge shards for handling image edges. After initial shards 1340 are generated, a group of extra shard 1345 can be created by identifying the initial shards 1340 with edge boundaries (e.g., shards with edges having parametric values u=0, u=1, v=0 or v=1). Device space (x,y) coordinates can be extended at least two pixels away from the interior of the surface perpendicular to the edge. The source parameter values of the extra shards 1345 have vertices slightly beyond the [0,1][0,1] parameter range of the image. As these edge shards 1345 are rendered, pixel values outside the [0,1] range can be assigned an empty value. The rendering process can automatically interpolate to this empty value, creating a smooth edge for the distorted image.

Figure 27:
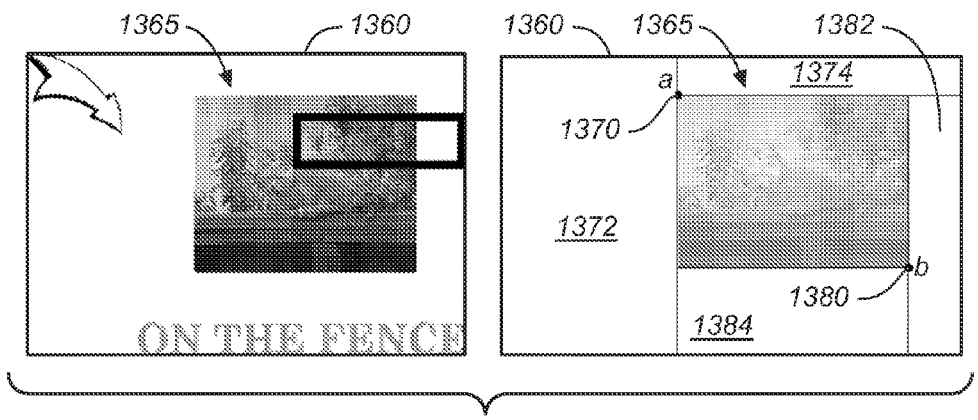
FIG. 27 illustrates subdividing a distortion region.

FIG. 27 illustrates subdividing a distortion region. As discussed above, the image distortion description is applied to the distortion region, which can be the bounding box for all the image objects to be distorted. When the raster artwork completely encloses the vector artwork, the tessellation process (e.g., recursive subdivision, shard creation and scan conversion) is applied to the raster artwork over the full parameter range of the distortion area. However, if the raster artwork does not fill the entire distortion area (e.g., it does not completely contain the vector artwork, or there are multiple raster images in the artwork to be distorted), then the parameter space of the tessellation for the raster is adjusted.

Adjusting the parameter space involves performing an initial subdivision of a distortion region 1360 to identify a corresponding subdivision of the image distortion description. This initial subdivision of the image distortion description is done to trim the parameter space before the tessellation described above is performed. For example, if a raster graphic 1365 in the distortion region 1360 occupies a rectangle defined by points a 1370 and b 1380, the rectangle coordinates can be converted to the local coordinates of the distortion space (usually 0 . . . 1), and then four initial subdivisions can be performed.

The first subdivision splits the image distortion description vertically at $a_x$ and discards the left portion 1372. The second subdivision splits the image distortion description horizontally at $a_y$ and discards the top portion 1374. The third subdivision splits the image distortion description at $b_x$ and discards the right portion 1382. The last subdivision splits the image distortion description at $b_y$, and discards the bottom portion 1384. Because the subdivisions are done in the parameter space of the image distortion, the original coordinates of b are modified to $\hat{b}$ because the parameter space is shifted after the first two subdivisions. This can be accomplished with:

$$m = \frac{1}{1-a_x}$$

$$\hat{b}_x = mb_x + (1-m)$$

A similar computation can be performed to obtain $\hat{b}_y$.

Figure 28:
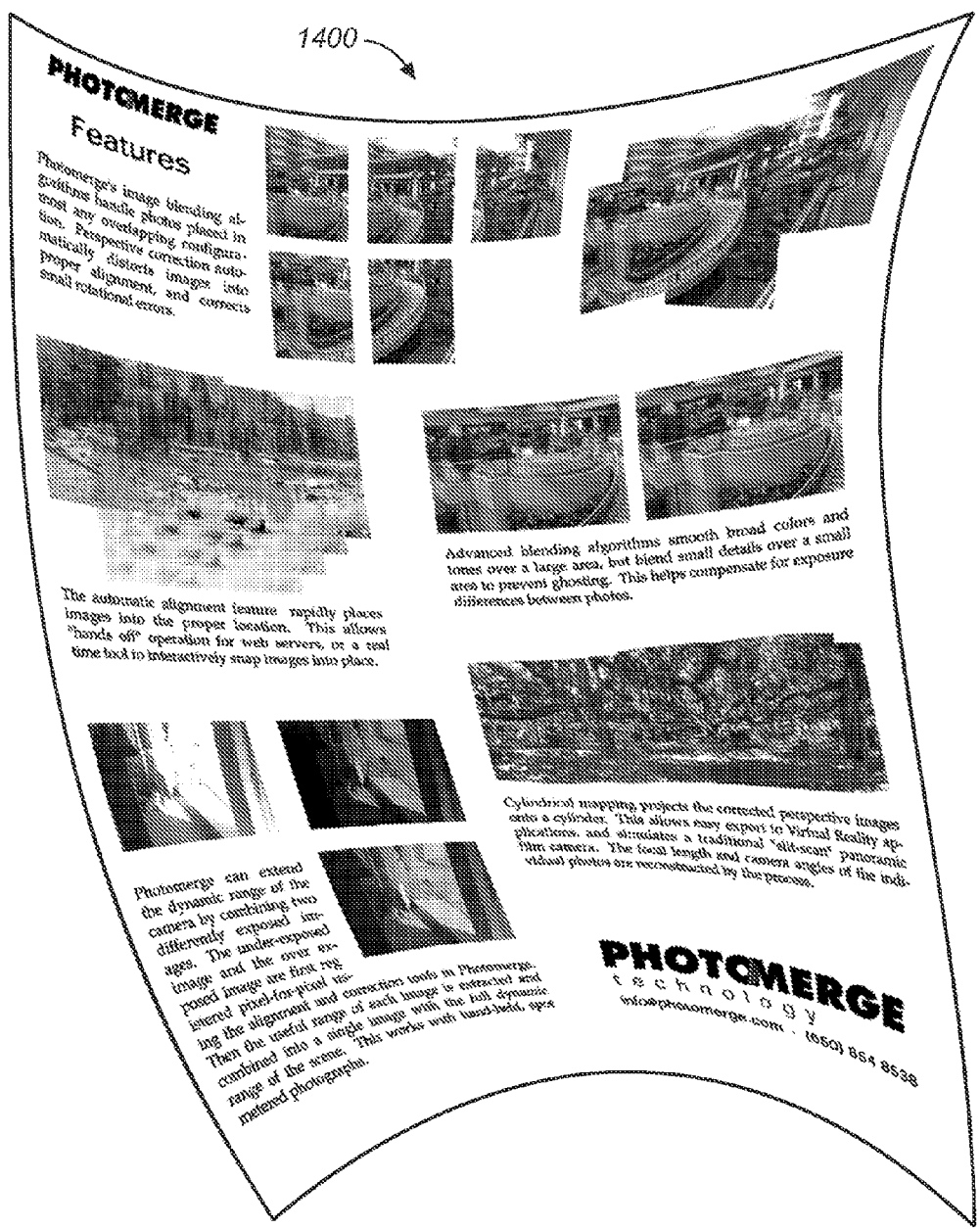
FIG. 28 illustrates a distorted electronic document having multiple image objects of various types.

FIG. 28 illustrates a distorted page 1400 from an electronic document. An image portion that is distorted using the techniques described above can be a full page image, such as the distorted page 1400, which includes multiple image objects of various types such as raster, text and line artwork. The full page image can be stored in a final format electronic document, which is an electronic document describing one or more virtual pages having a predetermined final format. The predetermined final format defines a specific visual appearance for the electronic document when displayed or printed. A final format document generally provides a device-independent format for publishing and/or distributing electronic documents. Thus, a final format document is conventionally a file that lies between a layout program and the typical raster image processors, which drive traditional printing apparatus.

An example of a final format is the Portable Document Format (PDF) provided by Adobe Systems Incorporated of San Jose, Calif. Example software for creating and reading PDF documents is the Acrobat® software, also of Adobe Systems Incorporated The Adobe® Acrobat® software is based on Adobe® PostScript® technology which describes formatted pages of a document in a device-independent fashion.

The invention can be implemented in digital electronic circuitry, or in computer hardware, firmware, software, or in combinations of them. Apparatus of the invention can be implemented in a software product (e.g., a computer program product) tangibly embodied in a machine-readable storage device for execution by a programmable processor; and processing operations of the invention can be performed by a programmable processor executing a program of instructions to perform functions of the invention by operating on input data and generating output. The invention can be implemented advantageously in one or more software programs that are executable on a programmable system including at least one programmable processor coupled to receive data and instructions from, and to transmit data and instructions to, a data storage system, at least one input device, and at least one output device. Each software program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory, a random access memory and/or a machine-readable signal (e.g., a digital signal received through a network connection). Generally, a computer will include one or more mass storage devices for storing data files; such devices include magnetic disks, such as internal hard disks and removable disks; magneto-optical disks; and optical disks. Storage devices suitable for tangibly embodying software program instructions and data include all forms of non-volatile memory, including by way of example semiconductor memory devices, such as EPROM (electrically programmable read-only memory), EEPROM (electrically erasable programmable read-only memory), and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD (liquid crystal display) screen for displaying information to the user and a keyboard and a pointing device such as a mouse or a trackball by which the user can provide input to the computer system. The computer system can be programmed to provide a graphical user interface through which computer programs interact with users.

The invention has been described in terms of particular embodiments. Other embodiments are within the scope of the following claims. The logic flows depicted in FIGS. 1 and 21 do not require the particular order shown, or sequential order, to achieve desirable results. For example, receiving the image distortion description need not be an operation performed separate from the application of the image distortion description to vector and raster artwork. The image distortion description can be applied to both types of artwork as the distortion description is being received, or the image distortion description can be applied only partially as it being received (e.g., vector graphics can be distorted on a screen as the distortion description is being input, while raster graphics can be distorted once a complete distortion description has been input; the general effect of the distortion description on the raster graphic can be displayed as the input is received by using a generated graphic, which can overlay the raster graphic). In certain implementations, multitasking and parallel processing may be preferable.

What is claimed is:

1. A computer-implemented method comprising:

receiving an image distortion description to be applied to an image portion including a vector graphic and a raster graphic displayed on the screen of a display device, the raster graphic and the vector graphic being separately distortable and distinct image objects;

applying the image distortion description to the vector graphic to produce a distorted vector graphic and independently applying the image distortion description to the raster graphic to produce a distorted raster graphic, the applications being independent in the sense that no result of either application is used as input to the other, the distorted vector graphic and the distorted raster graphic together forming a distorted image portion;

wherein independently applying the image distortion description to the raster graphic comprises using the image distortion description as a control structure governing resampling of the raster graphic;

wherein receiving the image distortion description comprises: receiving a first input designating the raster graphic to be distorted, receiving a second input designating the vector graphic to be distorted, and receiving a third input defining the image distortion description; and wherein the designated raster graphic and the designated vector graphic define a distortion region, the method further comprising:

converting coordinates of the vector graphic into a parameter space of the distortion region; and if the distortion region is larger than the raster graphic, subdividing the image distortion description with respect to the raster graphic before applying the image distortion description to the raster graphic;

wherein independently applying the image distortion description to the raster graphic further comprises: tessellating the image distortion description into polygons; checking for any backward facing ones of the polygons; and resampling the raster graphic based on the tessellated image distortion description.

2. The method of claim 1, wherein applying the image distortion description to the vector graphic comprises composing the image distortion description with the vector graphic to retain curve information as curve information and to maintain a resolution independent aspect of the vector graphic; and wherein resampling the raster graphic comprises extending edges of the raster graphic to provide data values for interpolation.

3. The method of claim 1, wherein the raster graphic does not have a mapping association with another image object in the image portion.

4. The method of claim 1, wherein the image portion comprises a full page image stored in a final format electronic document.

5. The method of claim 1, wherein receiving the third input defining the image distortion description comprises receiving inputs specifying a configuration of an adjustable predefined distortion type.

6. The method of claim 1, wherein receiving the first input designating the raster graphic to be distorted comprises receiving inputs defining a selection box to cover a portion of the raster graphic, and wherein receiving the second input designating the vector graphic to be distorted comprises receiving inputs defining the selection box to cover a portion of the vector graphic.

7. The method of claim 1, wherein receiving the third input defining the image distortion description comprises receiving inputs specifying movements of a cursor across the distortion region.

8. The method of claim 1, wherein the image distortion description comprises a tensor-product Bézier mesh, and wherein the vector graphic comprises a cubic Bézier curve.

9. The method of claim 1, wherein receiving the first input designating the raster graphic to be distorted comprises receiving a first input generated by a macro operation, and wherein receiving the second input designating the vector graphic to be distorted comprises receiving a second input generated by the macro operation.

10. A software product, tangibly stored on a computer-readable medium, the software product comprising instructions operable to cause a programmable processor to perform operations comprising:

receiving through a single interface tool in a graphical user interface an image distortion description to be applied to an image portion including a vector graphic and a raster graphic displayed on the screen of a display device, the raster graphic and the vector graphic being separately distortable and distinct image objects;

applying the image distortion description to the vector graphic to produce a distorted vector graphic and independently applying the image distortion description to the raster graphic to produce a distorted raster graphic, the applications being independent in the sense that no result of either application is used as input to the other, the distorted vector graphic and the distorted raster graphic together forming a distorted image portion;

wherein independently applying the image distortion description to the raster graphic comprises using the image distortion description as a control structure governing resampling of the raster graphic;

wherein receiving the image distortion description comprises: receiving a first input designating the raster graphic to be distorted, receiving a second input designating the vector graphic to be distorted, and receiving a third input defining the image distortion description; and wherein the designated raster graphic and the designated vector graphic define a distortion region, the operations further comprising:

converting coordinates of the vector graphic into a parameter space of the distortion region; and if the distortion region is larger than the raster graphic, subdividing the image distortion description with respect to the raster graphic before applying the image distortion description to the raster graphic;

wherein independently applying the image distortion description to the raster graphic further comprises: tessellating the image distortion description into polygons; checking for any backward facing ones of the polygons; and resampling the raster graphic based on the tessellated image distortion description.

11. The software product of claim 10, wherein applying the image distortion description to the vector graphic comprises composing the image distortion description with the vector graphic to retain curve information as curve information and to maintain a resolution independent aspect of the vector graphic; and wherein resampling the raster graphic comprises extending edges of the raster graphic to provide data values for interpolation.

12. The software product of claim 10, wherein receiving the first input designating the raster graphic to be distorted comprises receiving inputs defining a selection box to cover a portion of the raster graphic, and wherein receiving the second input designating the vector graphic to be distorted comprises receiving inputs defining the selection box to cover a portion of the vector graphic.

13. The software product of claim 10, wherein receiving the first input designating the raster graphic to be distorted comprises receiving a first input generated by a macro operation, and wherein receiving the second input designating the vector graphic to be distorted comprises receiving a second input generated by the macro operation.

14. The software product of claim 10, wherein receiving the third input defining the image distortion description comprises receiving inputs specifying movements of a cursor across the distortion region.

15. The software product of claim 10, wherein receiving the third input defining the image distortion description comprises receiving inputs specifying a configuration of an adjustable predefined distortion type.

16. The software product of claim 10, wherein the image distortion description comprises a tensor-product Bézier mesh, and wherein the vector graphic comprises a cubic Bézier curve.

17. The software product of claim 10, wherein the raster graphic does not have a mapping association with another image object in the image portion.

18. The software product of claim 10, wherein the image portion comprises a full page image stored in a final format electronic document.

19. A system for illustrating two dimensional images, the system comprising:

means for receiving an image distortion description to be applied to an image including a vector graphic and a raster graphic displayed on the screen of a display device, the raster graphic and the vector graphic being separately distortable and distinct image objects; and means for applying the image distortion description to the vector graphic to produce a distorted vector graphic and independently applying the image distortion description to the raster graphic to produce a distorted raster graphic, the applications being independent in the sense that no result of either application is used as input to the other, wherein the distorted vector graphic and the distorted raster graphic correspond to a consistent distortion as defined by the image distortion description across a distorted image including the distorted vector graphic and the distorted raster graphic;

wherein the means for applying the image distortion description to the raster graphic comprises means for resampling the raster graphic using a mathematical control structure;

wherein the means for receiving the image distortion description comprises means for receiving a first input designating the raster graphic to be distorted, a second input designating the vector graphic to be distorted, and a third input defining the image distortion description; and wherein the designated raster graphic and the designated vector graphic define a distortion region, the system further comprising:

means for converting coordinates of the vector graphic into a parameter space of the distortion region; and means for subdividing the image distortion description with respect to the raster graphic, if the distortion region is larger than the raster graphic, before applying the image distortion description to the raster graphic;

wherein the means for applying the image distortion description to the raster graphic comprises: means for tessellating the image distortion description into polygons; means for checking for any backward facing ones of the polygons; and the means for resampling comprising means for resampling the raster graphic based on the tessellated image distortion description.

20. The system of claim 19, wherein the means for applying the image distortion description to the vector graphic comprises means for composing the mathematical control structure with the vector graphic to retain curve information as curve information and to maintain a resolution independent aspect of the vector graphic; and wherein the means for resampling comprises means for extending edges of the raster graphic to provide data values for interpolation.

21. The system of claim 19, wherein the receiving means comprises free-form means for receiving arbitrary user-designed image distortions.

22. The system of claim 19, wherein the raster graphic does not have a mapping association with another image object in the distorted image.

23. The system of claim 19, wherein the distorted image comprises a full page image stored in a final format electronic document.

24. The system of claim 19, wherein the means for receiving the third input defining the image distortion description comprises means for receiving inputs specifying a configuration of an adjustable predefined distortion type.

25. The system of claim 19, wherein the means for receiving the first input designating the raster graphic to be distorted comprises means for receiving inputs defining a selection box to cover a portion of the raster graphic, and wherein the means for receiving the second input designating the vector graphic to be distorted comprises means for receiving inputs defining the selection box to cover a portion of the vector graphic.

26. The system of claim 19, wherein the means for receiving the first input designating the raster graphic to be distorted comprises means for receiving a first input generated by a macro operation, and wherein the means for receiving the second input designating the vector graphic to be distorted comprises means for receiving a second input generated by the macro operation.

27. The system of claim 19, wherein the means for receiving the third input defining the image distortion description comprises means for receiving inputs specifying movements of a cursor across the distortion region.

28. The system of claim 19, wherein the image distortion description comprises a tensor-product Bézier mesh, and wherein the vector graphic comprises a cubic Bézier curve.

* * * * *

UNITED STATES PATENT AND TRADEMARK OFFICE
CERTIFICATE OF CORRECTION

| | | |
|---|---|---|
| PATENT NO. | : 7,385,612 B1 | Page 1 of 1 |
| APPLICATION NO. | : 10/160574 | |
| DATED | : June 10, 2008 | |
| INVENTOR(S) | : John W. Peterson | |

It is certified that error appears in the above-identified patent and that said Letters Patent is hereby corrected as shown below:

Claim 10:
    column 21, line 59:
        insert --storage--, after "readable"

Signed and Sealed this

Fourteenth Day of April, 2009

JOHN DOLL
*Acting Director of the United States Patent and Trademark Office*